(12) United States Patent
Chu et al.

(10) Patent No.: US 12,457,587 B2
(45) Date of Patent: Oct. 28, 2025

(54) DEVICE, SYSTEM, AND METHOD FOR WIRELESS COMMUNICATIONS

(71) Applicant: NXP USA, Inc., Austin, TX (US)

(72) Inventors: Liwen Chu, San Ramon, CA (US); Young Hoon Kwon, Laguna Niguel, CA (US); Hongyuan Zhang, Fremont, CA (US); Huiling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 574 days.

(21) Appl. No.: 17/583,030

(22) Filed: Jan. 24, 2022

(65) Prior Publication Data

US 2022/0264566 A1    Aug. 18, 2022

Related U.S. Application Data

(60) Provisional application No. 63/261,400, filed on Sep. 20, 2021, provisional application No. 63/152,525, filed on Feb. 23, 2021, provisional application No. 63/148,907, filed on Feb. 12, 2021.

(51) Int. Cl.
*H04W 72/0446* (2023.01)

(52) U.S. Cl.
CPC ............... *H04W 72/0446* (2013.01)

(58) Field of Classification Search
CPC ........... H04W 72/0446; H04W 74/004; H04W 74/0816; H04W 84/12
See application file for complete search history.

(56) References Cited

U.S. PATENT DOCUMENTS

| | | | |
|---|---|---|---|
| 2014/0328313 A1* | 11/2014 | Merlin | H04L 5/0094 370/328 |
| 2014/0334387 A1* | 11/2014 | Doppler | H04W 74/0816 370/329 |
| 2016/0100408 A1* | 4/2016 | Hedayat | H04L 5/0037 370/329 |
| 2016/0374093 A1* | 12/2016 | Asterjadhi | H04W 72/12 |
| 2017/0201944 A1* | 7/2017 | Lin | H04W 52/0229 |
| 2017/0201956 A1* | 7/2017 | Huang | H04W 74/006 |
| 2017/0257888 A1* | 9/2017 | Kneckt | H04W 74/0816 |
| 2017/0332385 A1* | 11/2017 | Shirali | H04W 28/0278 |
| 2018/0324851 A1* | 11/2018 | Zhang | H04W 74/006 |
| 2018/0359807 A1* | 12/2018 | Kim | H04W 72/0446 |
| 2019/0246312 A1* | 8/2019 | Kim | H04W 52/365 |
| 2019/0319738 A1* | 10/2019 | Ahn | H04L 1/1621 |
| 2020/0336969 A1* | 10/2020 | Gan | H04W 48/08 |
| 2021/0315009 A1* | 10/2021 | Xia | H04W 74/0816 |
| 2022/0053560 A1* | 2/2022 | Xin | H04W 28/0268 |
| 2022/0174732 A1* | 6/2022 | Xia | H04L 5/0037 |
| 2023/0413327 A1* | 12/2023 | Kim | H04W 74/0816 |

OTHER PUBLICATIONS

Das, Dibakar et al. "AP assisted SU PPDU Tx for 11be R1", IEEE 802.11-20/1312r8, Oct. 30, 2020, 8 pgs.

\* cited by examiner

*Primary Examiner* — Thomas R Cairns
*Assistant Examiner* — Kai Chang

(57) ABSTRACT

Embodiments of a device, a system, and a method for wireless communications are disclosed. In an embodiment, a device includes a processor configured to initiate an assisted single-user (SU) transmission, where the device is a Transmission Opportunity (TXOP) owner that allocates part of a TXOP, and exchange frames according to the assisted SU transmission.

20 Claims, 13 Drawing Sheets

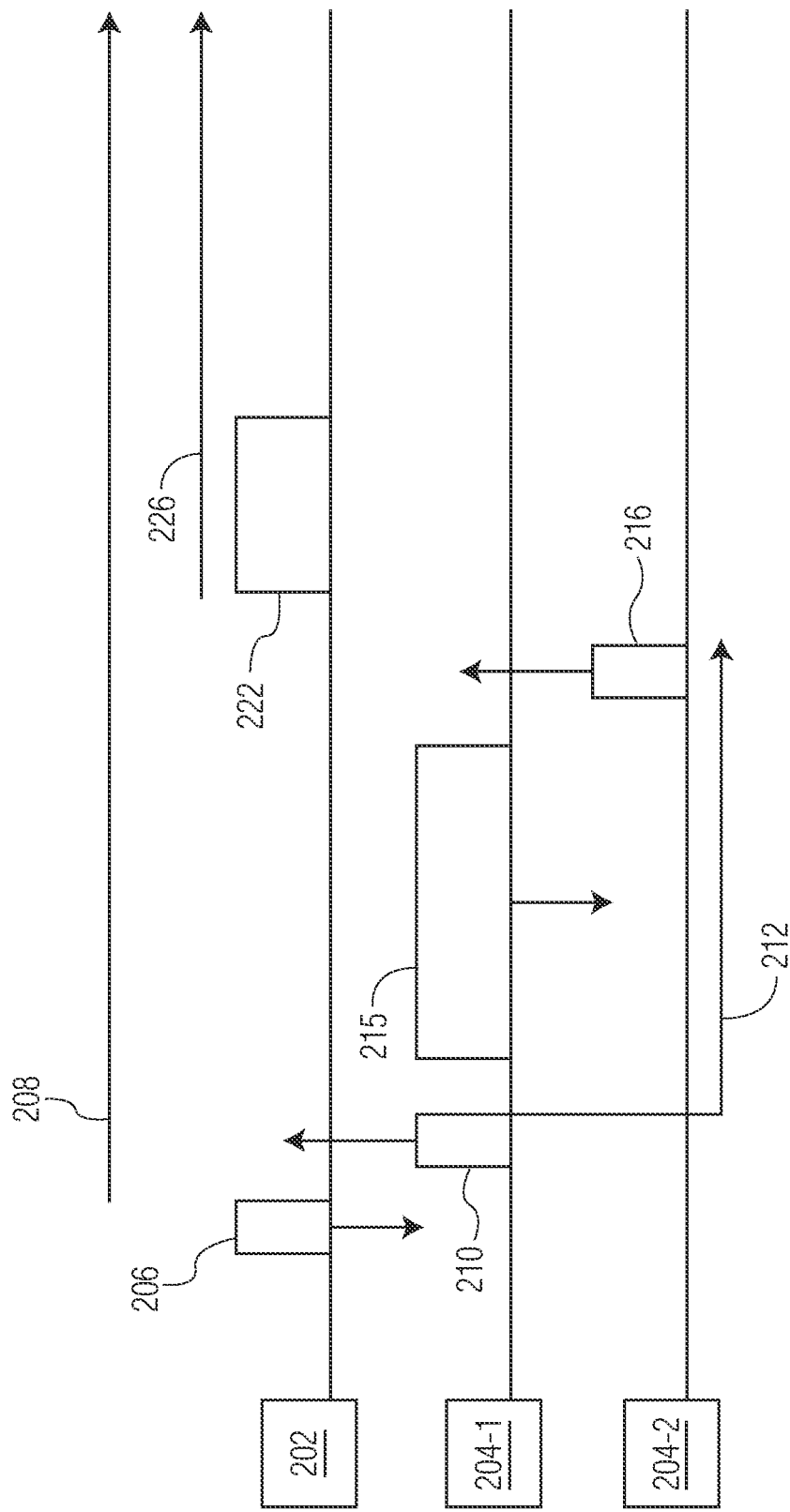

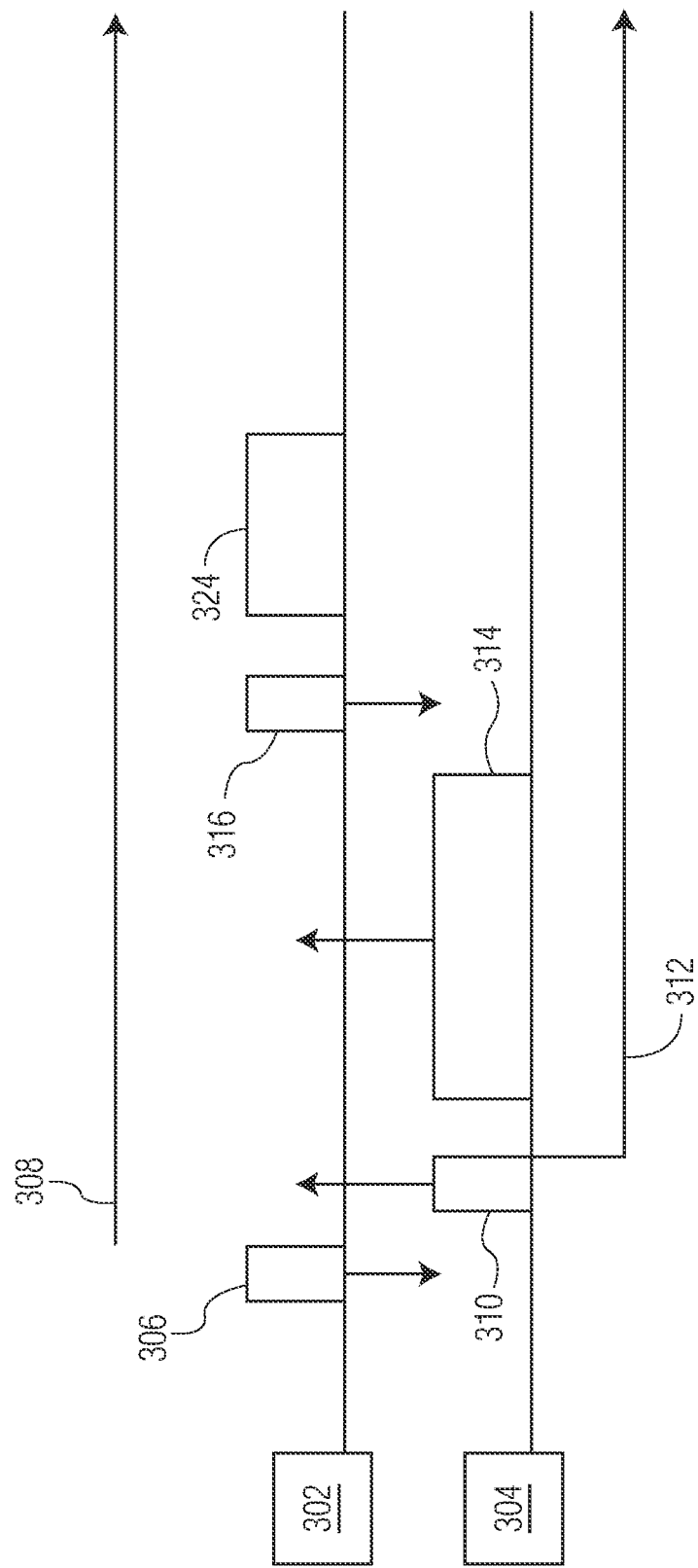

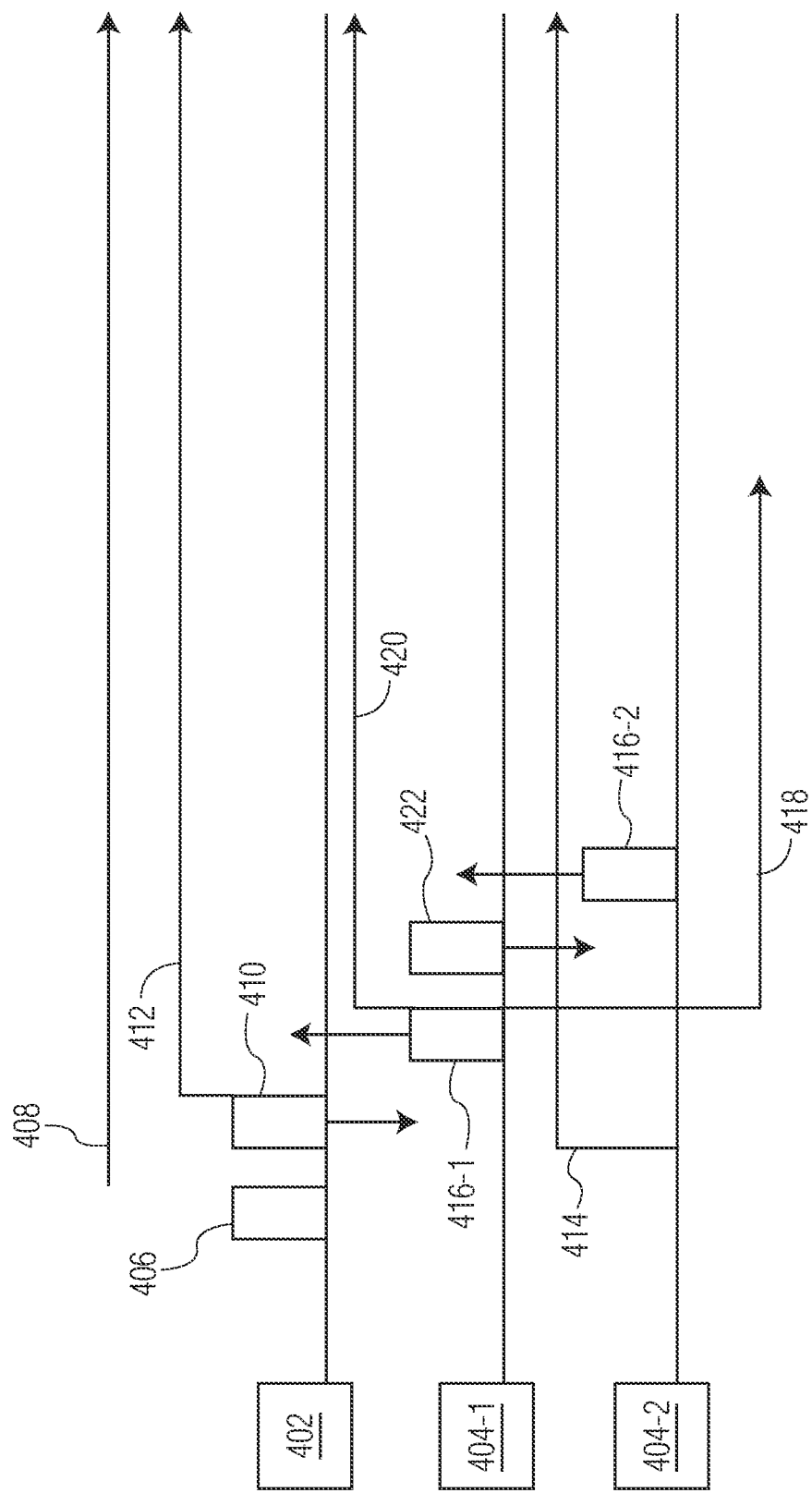

DEVICE, SYSTEM, AND METHOD FOR WIRELESS COMMUNICATIONS

CROSS-REFERENCE TO RELATED APPLICATIONS

This application is entitled to the benefit of U.S. Provisional Patent Application Ser. No. 63/148,907, filed on Feb. 12, 2021, U.S. Provisional Patent Application Ser. No. 63/152,525, filed on Feb. 23, 2021, and U.S. Provisional Patent Application Ser. No. 63/261,400, filed on Sep. 20, 2021, each of which is incorporated by reference herein.

BACKGROUND

In wireless communications, wireless devices, e.g., access points (APs) or a non-AP stations (STAs), exchange frames and execute various wireless operations in response to the exchanged frames. As an example, an AP may initiate an assisted single-user (SU) transmission and allocate part of a Transmission Opportunity (TXOP) during a frame exchange with an STA. However, according to conventional wireless communication techniques, the STA may be unable to differentiate which frame transmission is being initiated by the AP and/or unable to determine which device is a TXOP owner during an allocated time. As such, wireless devices operating according to conventional wireless communication techniques may experience errors during frame exchanges and communicate inefficiently.

SUMMARY

Embodiments of a device, a system, and a method for wireless communications are disclosed. In an embodiment, a device includes a processor configured to initiate an assisted single-user (SU) transmission, where the device is a Transmission Opportunity (TXOP) owner that allocates part of a TXOP, and exchange frames according to the assisted SU transmission.

In an embodiment, the device is an access point (AP) that allocates part of the TXOP to a station (STA) for an uplink (UL) frame transmission, and where the AP remains the TXOP owner during an allocated time.

In an embodiment, the device is an AP that allocates part of the TXOP to an STA for a peer-to-peer (P2P) frame transmission, and where the STA becomes the TXOP owner during an allocated time.

In an embodiment, the device is an AP that allocates part of the TXOP to an STA for a mixed P2P and UL frame transmission, and where the STA becomes the TXOP owner during an allocated time.

In an embodiment, the device is an AP that allocates part of the TXOP to an STA, and where the STA releases the TXOP to the AP via an explicit indication included in a High Efficiency (HE) Control field.

In an embodiment, the device is an AP that allocates part of the TXOP to an STA, and where the STA reports a resource request to the AP for the assisted SU transmission.

In an embodiment, the resource request is reported via at least one of a Quality of Service (QoS) Control field, a Buffer Status Report (BSR) Control field, and a new defined HE Control field.

In an embodiment, the resource request indicates at least one of a requested medium time, the requested medium time and a Traffic Identifier (TID), the requested medium time and a reference bandwidth, and the requested medium time, the TID, and the reference bandwidth.

In an embodiment, the requested medium time indicates a medium time requested for requested TIDs.

In an embodiment, the TID indicates a TID with highest priority amongst TIDs whose medium time is requested.

In an embodiment, the reference bandwidth indicates at least one of a bandwidth used for a P2P frame transmission and a maximum allowed bandwidth.

In an embodiment, the device is an AP that allocates part of the TXOP to an STA for a P2P frame transmission, and where the AP initiates the assisted SU transmission by transmitting a Clear to Send (CTS)-to-Self frame and a multi-user (MU) Request to Send (RTS) (MU-RTS) TXOP Sharing (TXS) frame.

In an embodiment, the device is an AP that allocates part of the TXOP to a first STA, and where the assisted SU transmission includes transmitting, by the first STA to the AP, a CTS frame in response to receiving an MU-RTS TXS frame, where the CTS frame includes a Duration field with a value of DURATION, and transmitting, by the first STA to a second STA, a CTS-to-Self frame whose Duration field is more than DURATION minus Short Interframe Space (SIFS) minus a transmission time of a Physical Layer Convergence Protocol (PLCP) Protocol Data Unit (PPDU) that includes the CTS-to-Self frame.

In an embodiment, the second STA sets a network allocation vector (NAV) timer in response to receiving the CTS-to-Self frame.

In an embodiment, the device is an AP that allocates part of the TXOP to a first STA, and where the assisted SU transmission includes transmitting, by the first STA to the AP, a CTS frame in response to receiving an MU-RTS TXS frame, and transmitting, by the first STA to a second STA, a frame with a Duration field in at least one of a Media Access Control (MAC) header and a physical layer (PHY) header.

In an embodiment, the Duration field is set no later than an ending time within the TXOP allocated to the first STA.

In an embodiment, the device is an AP that allocates part of the TXOP to an STA, and where the assisted SU transmission is an AP assisted SU transmission.

In an embodiment, the device is an STA that allocates part of the TXOP to another STA, and where the assisted SU transmission is an STA assisted SU transmission.

A system for wireless communications is also disclosed. The system includes an AP, where the AP includes a processor configured to initiate an AP assisted SU transmission, where the AP is a TXOP owner that allocates part of a TXOP, and an STA, where the STA includes another processor configured to exchange frames with the AP according to the AP assisted SU transmission.

A method for wireless communications is also disclosed. The method involves initiating, by a device, an assisted SU transmission, where a TXOP owner allocates part of a TXOP, and exchanging, by the device, frames according to the assisted SU transmission.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 2B illustrates another example of a frame exchange according to an assisted SU transmission.

FIG. 3D illustrates another example of frame exchange sequences according to an assisted SU transmission that includes an allocated time release.

FIG. 4A illustrates an example of frame exchanges where a Duration field carries an indication.

Throughout the description, similar reference numbers may be used to identify similar elements.

DETAILED DESCRIPTION

Figure 1:
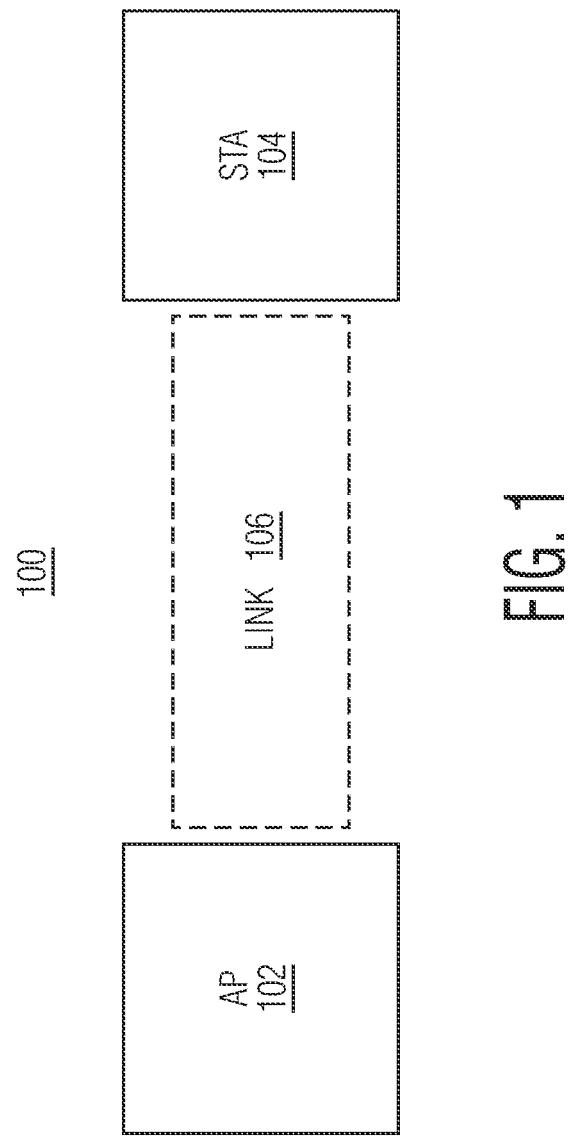
FIG. 1 depicts a wireless communications system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In embodiments of a wireless communications system, a wireless device, e.g., an access point (AP) (or a non-AP station (STA)) may exchange data frames, management frames, or control frames (e.g., data Media Access Control (MAC) Protocol Data Units (MPDUs), management MPDUs, or control MPDUs encapsulated in Physical Layer Convergence Protocol (PLCP) Protocol Data Units (PP-DUs)) with at least one STA associated with the AP. An AP may be configured to operate with associated STAs according to a communication protocol. For example, the communication protocol may be an Extremely High Throughput (EHT) communication protocol, or an Institute of Electrical and Electronics Engineers (IEEE) 802.11be communication protocol.

Features of wireless communication systems operating in accordance with the EHT communication protocol and/or next-generation communication protocols may be referred to herein as "non-legacy" features. In some embodiments of the wireless communications system described herein, different APs within range of an associated STA operating according to the EHT communication protocol are configured to operate according to at least one other communication protocol, which defines operation in a Basic Service Set (BSS) with the associated STA, but are generally affiliated with lower data throughput protocols. The lower data throughput communication protocols (e.g., High Efficiency (HE) communication protocol, Very High Throughput (VHT) communication protocol, etc.) may be collectively referred to herein as "legacy" communication protocols.

FIG. 1 depicts a wireless communications system 100 that is used for wireless (e.g., Wi-Fi) communications. In the embodiment depicted in FIG. 1, the wireless communications system includes an AP, implemented as AP 102, and an STA, implemented as STA 104. The wireless communications system can be used in various applications, such as industrial applications, medical applications, computer applications, and/or consumer or enterprise applications. In some embodiments, the wireless communications system may be compatible with an IEEE 802.11 protocol, for example, the wireless communications system may be compatible with the IEEE 802.11be protocol. Although the depicted wireless communications system 100 is shown in FIG. 1 with certain components and described with certain functionality herein, other embodiments of the wireless communications system may include fewer or more components to implement the same, less, or more functionality. For example, in some embodiments, the wireless communications system includes a single AP with multiple STAs, or multiple APs with more than one STA. In another example, although the wireless communications system is shown in FIG. 1 as being connected in a certain topology, the network topology of the wireless communications system is not limited to the topology shown in FIG. 1.

In the embodiment depicted in FIG. 1, AP 102 may be a link specific component that implements lower layer MAC functionalities (e.g., backoff, frame transmission, frame reception, etc.). AP 102 may be implemented in hardware (e.g., circuits), software, firmware, or a combination thereof. AP 102 may be fully or partially implemented as an integrated circuit (IC) device. In some embodiments, AP 102 may be compatible with at least one wireless local area network (WLAN) communications protocol (e.g., at least one IEEE 802.11 protocol). For example, AP 102 may be compatible with the IEEE 802.11be protocol, such that AP 102 operates according to the IEEE 802.11be communication protocol. In some embodiments, AP 102 connects to a local area network (e.g., a LAN) and/or to a backbone network (e.g., the Internet) through a wired connection and wirelessly connects to wireless STAs, for example, through one or more WLAN communications protocols, such as the IEEE 802.11 protocol.

In some embodiments, AP 102 includes at least one antenna, at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets through the at least one antenna. In some embodiments, the at least one controller may be implemented in a device that includes a processor, for example, a microcontroller, a host processor, a host, a digital signal processor (DSP), or a central processing unit (CPU), which can be integrated in a corresponding transceiver. In addition, although the wireless communications system 100 is shown in FIG. 1 as including AP 102, the AP may alternatively be an STA.

In the embodiment depicted in FIG. 1, STA 104 may be implemented in hardware (e.g., circuits), software, firmware, or a combination thereof. STA 104 may be fully or partially implemented as an IC device. In some embodiments, STA 104 may be a communications device that wirelessly connects wireless APs and/or wireless STAs. For example, STA 104 may be implemented in a laptop, a desktop personal computer (PC), a mobile phone, or other communications device that supports at least one WLAN communications protocol. In some embodiments, STA 104 is a communications device compatible with at least one IEEE 802.11 protocol (e.g., the IEEE 802.11be protocol). In some embodiments, STA 104 implements a lower layer MAC data service interface. In addition, although the wireless communications system 100 is shown in FIG. 1 as including STA 104, the STA may alternatively be an AP.

In some embodiments, STA 104 includes at least one antenna, at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller may be implemented within a processor, such as a microcontroller, a host processor, a host, a DSP, or a CPU, which can be integrated in a corresponding transceiver.

In the embodiment depicted in FIG. 1, AP 102 communicates with STA 104 via a communication link, implemented as link 106. In an embodiment, a communication link (e.g., link 106) may include a BSS operating channel established by an AP or an STA (e.g., AP 102 or STA 104) that features multiple 20 MHz channels used to exchange frames between the AP and the STA. In some embodiments, a 20 MHz channel may be a punctured 20 MHz channel or an unpunctured 20 MHz channel. In addition, although AP 102 communicates (e.g., wirelessly communicates) with STA 104 via link 106, in other embodiments, AP 102 may communicate with more than one STA via more than one communication link.

In some embodiments, a device may be a Transmission Opportunity (TXOP) owner. A "TXOP owner" may be described as a device (e.g., an AP or an STA) that initiates and controls one or more frame exchange sequences within a TXOP (e.g., TXOP recovery, initiating a TXOP bandwidth negotiation, deciding when a TXOP will end, and/or transmitting frames to solicit control response frames). As described herein, a "TXOP" may be defined as a period that may include one or more frame exchange sequences in which APs and/or STAs may transmit and/or receive frames. In some embodiments, the TXOP owner (e.g., an AP) may allocate part of the TXOP to a device (e.g., an AP or an STA), such that the device that is allocated part of the TXOP becomes (or remains) the TXOP owner during an allocated time. As described herein, "allocated time" may be defined as a period for which a device has allocated part of a TXOP.

In some embodiments, an AP may transmit a multi-user (MU) Request to Send (RTS) (MU-RTS) frame to an STA to initiate an AP assisted single-user (SU) operation where within an allocated time (e.g., part of a TXOP), a destination STA (e.g., a first STA) of the MU-RTS frame performs either uplink (UL) frame exchanges with the AP, or peer-to-peer (P2P) frame exchanges with a P2P peer STA (e.g., a second STA). Examples of an assisted SU transmission may include UL frame exchanges, P2P frame exchanges, etc. In addition, the frame exchange may include transmission and/or reception of UL Aggregated-MPDUs (A-MPDUs), MPDUs, P2P A-MPDUs, or P2P MPDUs. In such an example, A-MPDUs and MPDUs are carried in an SU PPDU. In an embodiment, the STA to whom part of the TXOP is allocated may determine a Modulation and Coding Scheme (MCS), a number of spatial streams (Nss), and/or transmission power for its transmitted frames during the allocated time within the TXOP.

According to the 802.11be communication protocol, assisted SU transmissions may involve an STA initiating UL frame exchanges with an AP (e.g., an AP assisted UL SU transmission) or an STA initiating P2P frame exchanges with another STA (e.g., an AP assisted P2P SU transmission) through the AP's solicitation. According to conventional wireless communication techniques, the device that initiates multiple frame exchanges within its TXOP is a TXOP owner that controls TXOP recovery. Under the AP assisted SU transmission, the STA to whom part of the TXOP is allocated initiates multiple frame exchanges with an AP or a P2P peer STA within part of the TXOP. As such, the type of assisted SU transmission (e.g., UL frame transmission or P2P frame transmission), and which device is a TXOP owner within an allocated time of a TXOP to an STA where frames are exchanged according to the assisted SU transmission may need to be defined. In addition, which device performs a TXOP recovery and how the TXOP recovery is performed may also need to be defined because at most three devices can be involved. Parameters included in a PHY header also need to be defined for assisted SU transmissions.

In accordance with an embodiment of the invention, a technique for wireless communications involves initiating, by a device, an assisted SU transmission, wherein a TXOP owner allocates part of a TXOP, and exchanging, by the device, frames according to the assisted SU transmission. In such an embodiment, the device may be an AP or an STA, and the assisted SU transmission may be an AP assisted SU UL transmission or an AP assisted SU P2P transmission. In such embodiments, exchanging frames according to the assisted SU transmission and allocating part of the TXOP to another device (e.g., an STA) allows the STA to interpret how to transmit frames and maintain communication during the frame exchange. Therefore, implementing such techniques allows wireless devices to avoid frame transmission errors by using suitable transmission parameters and to exchange data more efficiently.

In an embodiment, an AP may select an AP assisted SU transmission or a UL trigger-based (TB) PPDU transmission. Techniques for selecting the AP assisted SU transmission or the UL TB PPDU transmission are described herein. Different techniques may be used so that a device (e.g., an STA) may disable or enable (disable/enable) an AP assisted SU transmission and a UL TB PPDU transmission separately, or at the same time.

In one embodiment, an STA can disable an AP assisted SU transmission and an UL TB (UL MU) transmission separately. In such an embodiment, signaling to disable/enable the UL MU transmission may involve using an Operating Mode (OM) Control field, and signaling to disable/enable the AP assisted SU transmission may involve defining a new HE Control field, such that each are separately defined. In such embodiment, when an STA that supports the AP assisted SU transmission disables transmission of UL MU data by using (e.g., transmitting) the new HE Control field (OM Control field) to announce the STA's UL MU disablement to the AP, the STA still allows for frame exchanges according to an AP assisted SU transmission. After the AP receives the OM Control field that disables the STA's UL MU, the AP can still solicit the STA to exchange frames according to the AP assisted SU transmission.

In another embodiment, an STA can (always) announce its disablement of the AP assisted SU transmission and the UL TB (UL MU) transmission at the same time. In such an embodiment, signaling to announce the disablement/enablement of the UL MU transmission and the AP assisted SU transmission can be performed via an OM Control field.

In an embodiment, to disable or enable an AP assisted SU transmission, an STA may announce whether to enable an AP assisted SU transmission via an HE control field, an action frame, or another management frame. As an example, the action frame transmitted by an STA to an AP can indicate whether the STA enables an AP assisted P2P transmission, or an AP assisted UL transmission. After the AP receives the announcement to disable AP assisted SU transmission from the STA, the AP will not solicit the STA perform the AP assisted P2P transmission or the AP assisted UL transmission. In another embodiment, a negotiation procedure (e.g., an AP assisted SU Request or an AP assisted SU Response) may be defined, such that an STA announces its enablement of the AP assisted SU transmission. After the AP receives such an announcement from the STA, the AP can solicit the STA to perform the AP assisted P2P transmission or the AP assisted UL transmission. In yet another embodiment, in a negotiated Target Wake Time (TWT) Service Period (SP) with an STA for a P2P frame transmission, the STA exchanges frames according to the AP assisted P2P transmission.

Techniques for operating according to an AP assisted UL SU mode or an AP assisted P2P SU mode are described herein. In one embodiment, when an STA is operating according to the AP assisted P2P SU mode, the STA can be scheduled to perform a UL TB PPDU transmission. In another embodiment, when an STA is operating according to the AP assisted UL SU mode, the STA may not be scheduled to perform a UL TB PPDU transmission. However, one exception may be that during a TWT dedicated for a P2P frame transmission with an STA, the STA may (only) perform a scheduled P2P transmission, such that the STA does not need to switch to an AP assisted P2P SU mode via an action frame. In yet another embodiment, there may be no specific AP assisted SU mode. In such an embodiment, an STA can be scheduled to perform a TB PPDU transmission, an SU PPDU transmission, and/or a P2P PPDU transmission via various trigger frames. During a TWT dedicated for a P2P frame transmission with the STA, the STA may (only) perform a scheduled P2P transmission.

In an embodiment, an AP may be a TXOP owner that allocates part of a TXOP. For example, the AP may allocate part of a TXOP to an STA for an AP assisted SU transmission, such that there may be a requirement within the allocated part of the TXOP. The requirement may be to define whether an original TXOP owner (e.g., the AP) or the STA (e.g., solicited STA) will be the TXOP owner that controls error recovery when a frame exchange cannot be performed successfully. Examples of frame exchanges according to an assisted SU transmission are described in further detail with reference to FIGS. 2A-2B.

Figure 2A:
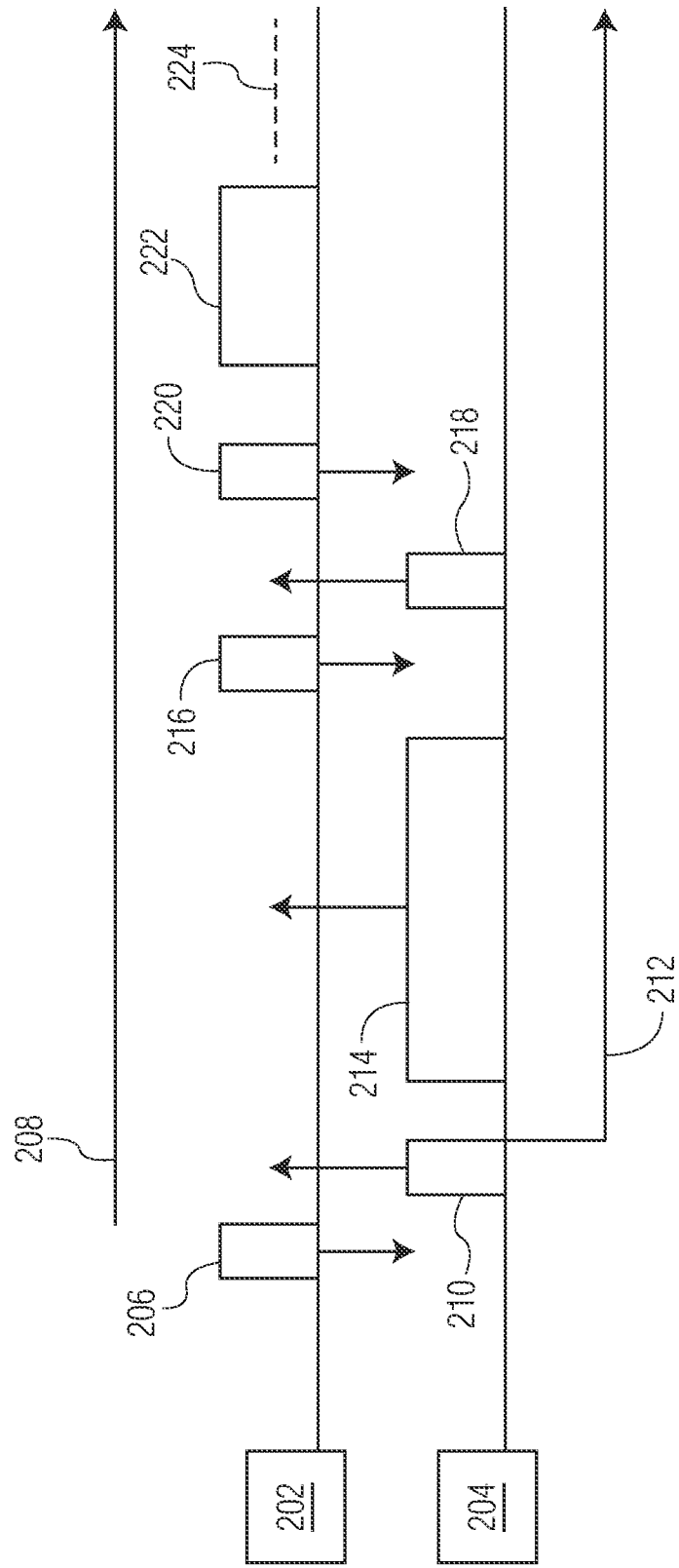
FIG. 2A illustrates an example of a frame exchange according to an assisted single-user (SU) transmission.

FIG. 2A illustrates an example of a frame exchange according to an assisted SU transmission. In the embodiment shown by FIG. 2A, a device, implemented as AP1 202, is a TXOP owner that initiates the frame exchange according to the assisted SU transmission (e.g., AP assisted SU transmission) by transmitting an MU-RTS TXOP Sharing (TXS) frame 206 to another device, implemented as STA1 204. Transmission of the MU-RTS TXS frame 206 also begins a TXOP 208, during which the TXOP owner, AP1 202, may allocate part of the TXOP 208. For example, AP1 202 can allocate part of the TXOP 208 by remaining as the TXOP owner during an allocated time, or by allocating part of the TXOP 208 to STA1 204, such that STA1 204 becomes the TXOP owner during the allocated time.

Once STA1 204 has successfully received the MU-RTS TXS frame 206, STA1 204 transmits a CTS frame 210 to AP1 202. After the CTS frame 210 has been transmitted by STA1 204, an SP allocated to STA1 204 begins (shown by arrow 212 extending from the CTS frame 210), such that STA1 204 was solicited to perform an AP assisted SU transmission. In an embodiment, AP1 202 allocates part of the TXOP 208 to STA1 204 as the SP allocated to STA1 204. In addition, during the SP allocated to STA1 204, STA1 204 initiates frame exchanges with AP1 202 according to the AP assisted SU transmission (e.g., AP assisted UL SU transmission). In such an embodiment, STA1 204 transmits a UL A-MPDU frame 214 in a PPDU (other than a TB PPDU) via a UL frame transmission, to which AP1 202 responds by transmitting a Block Acknowledgement (Ack) (BA) frame 216 to STA1 204.

STA1 204 then transmits an SP release frame 218 to AP1 202, such that the SP release frame 218 releases the TXOP back to an original TXOP owner (e.g., AP1 202). In one embodiment, the original TXOP owner gains control of the TXOP when the allocated time for an AP assisted SU transmission ends, even if STA 204 cannot use all the allocated time. AP1 202 then responds to the SP release frame 218 by transmitting an Ack frame 220 to STA1 204 and subsequently transmitting a DL A-MPDU frame 222, after which a medium becomes idle (shown by dashed lines 224). In another embodiment, AP1 202 subsequently transmits the DL A-MPDU frame 222 without checking whether the medium is idle after acknowledging the SP release frame 218.

FIG. 2B illustrates another example of a frame exchange according to an assisted SU transmission. In the embodiment shown by FIG. 2B, AP1 202 (the TXOP owner) initiates the frame exchange according to the assisted SU transmission (e.g., an AP assisted SU P2P transmission) by transmitting the MU-RTS TXS frame 206 to STA1 204-1, which begins the TXOP 208 and to which STA1 204-1 responds by transmitting the CTS frame 210 that begins the SP allocated to STA1 204-1 (shown by arrow 212 extending from the CTS frame 210) as previously described with reference to FIG. 2A.

However, as shown by FIG. 2B, STA1 204-1 transmits a P2P A-MPDU frame 215 via a P2P frame transmission to another STA, implemented as STA2 204-2, to which STA2 204-2 responds by transmitting the BA frame 216. The SP allocated to STA1 204-1 ends after the BA frame 216 is received by STA1 204-1. In such an embodiment, the P2P A-MPDU frame 215 and the BA frame 216 use all the allocated time for the AP assisted SU transmission. After STA1 204-1 receives the BA frame 216, the original TXOP owner, AP1 202, gains control of the TXOP, transmits the DL A-MPDU frame 222, and resumes control of the TXOP as the TXOP owner (shown by arrow 226).

In one embodiment, multiple frame exchanges can occur during the AP assisted SU P2P transmission. In another embodiment, STA1 204-1 releases the time allocated to it by transmitting an SP release frame (e.g., SP release frame 218) to the original TXOP owner, AP1 202, if STA1 204-1 cannot use all the allocated time.

With reference to FIG. 2A and FIG. 2B, several techniques described herein may be used by a device (e.g., AP1 202) to allocate part of a TXOP (e.g., TXOP 208). In an embodiment, AP1 202 may allocate part of the TXOP 208 to STA1 (e.g., STA1 204 or STA1 204-1) for a UL frame transmission, such that AP1 202 remains as a TXOP owner during an allocated time. In another embodiment, AP1 202 may allocate part of the TXOP 208 to STA1 for a P2P frame transmission, such that STA1 becomes the TXOP owner during the allocated time. In yet another embodiment, AP1 202 may allocate part of the TXOP 208 to STA1 for a mixed P2P and UL frame transmission, such that STA1 becomes the TXOP owner during the allocated time.

In some embodiments, during time allocated by an AP (e.g., AP1 202) to an STA (e.g., STA1 204 or STA1 204-1) for a P2P frame transmission or a UL frame transmission, the STA may become a TXOP owner or the AP may remain as the TXOP owner. In one embodiment, when the STA transmits a UL frame/A-MPDU to the AP during the allocated time in one frame exchange, the AP remains as a TXOP owner, and when the STA transmits a P2P frame/A-MPDU to another STA (e.g., a second STA), the STA becomes the TXOP owner. In such embodiments, which device becomes the TXOP owner during the allocated time (e.g., during the time allocated to the STA for an AP assisted SU transmission) may be implicitly defined. In another embodiment, an explicit signal may be defined to indicate which device (e.g., the AP or the STA) will be the TXOP owner during the allocated time for an AP assisted TXOP SU transmission.

In one embodiment, when an AP allocates part of a TXOP to an STA for a UL frame transmission, the AP may remain as the TXOP owner during an allocated time. In another embodiment, when the AP allocates part of the TXOP to the STA for a P2P frame transmission, the STA becomes the TXOP owner during the allocated time. In yet another embodiment, when the AP allocates part of the TXOP to the STA for a mixed P2P and UL frame transmission, the STA becomes the TXOP owner during the allocated time.

In one embodiment, when an AP allocates part of a TXOP to an STA for a UL frame transmission or a P2P frame transmission where another STA also associates with the AP (e.g., when two peer STAs associate with the AP), the AP remains as the TXOP owner during an allocated time. In another embodiment, when the AP allocates part of the TXOP to the STA for a P2P frame transmission and at least one peer STA does not associate with the AP, the STA associated with the AP becomes the TXOP owner during the allocated time.

In an embodiment, an STA that is allocated part of a TXOP may release the TXOP back to an original TXOP owner via an allocated time release. For example, if an STA is allocated part of a TXOP by an AP during a frame exchange according to an AP assisted SU transmission, and the STA is to release a medium before an allocated time ends, then the STA may explicitly notify the AP that the STA intends to release the TXOP back to the AP. In one embodiment, the STA releases the TXOP back to the AP via a new control frame (e.g., SP release frame 218 shown in FIG. 2A). In another embodiment, the STA releases the TXOP to the AP via an explicit indication included in an HE Control field. In such an embodiment, the HE Control field may be an updated existing HE Control field, such that the updated existing HE Control field uses one reserved bit in a Context-Aware Service (CAS) Control field or a new HE Control field for the explicit indications.

Examples of frame exchanges according to an assisted SU transmission that include an allocated time release are described in further detail with reference to FIGS. 3A-3E.

Figure 3A:
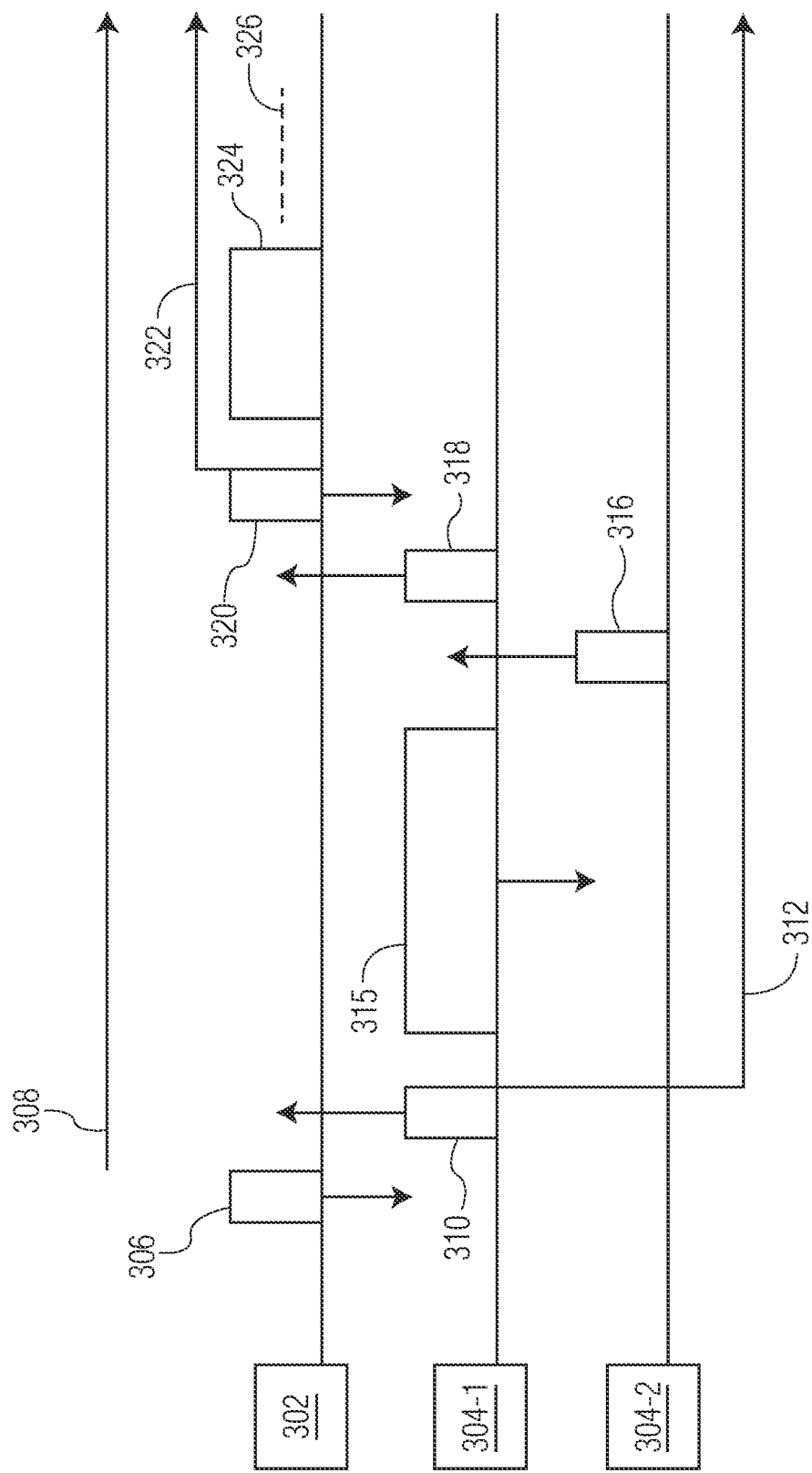
FIG. 3A illustrates an example of frame exchange sequences according to an assisted SU transmission that includes an allocated time release.

FIG. 3A illustrates an example of frame exchange sequences according to an assisted SU transmission that includes an allocated time release. In the embodiment shown by FIG. 3A, AP1 302, a TXOP owner, initiates the frame exchange according to the assisted SU transmission by transmitting an MU-RTS TXS frame 306 to STA1 304-1, which begins a TXOP 308 and to which STA1 304-1 responds by transmitting a CTS frame 310 that begins an SP allocated to STA1 304-1 (shown by arrow 312 extending from the CTS frame 310) as previously described with reference to FIG. 2A. In such an embodiment, AP1 302 allocates part of the TXOP 308 to STA1 304-1 during the SP allocated to STA1 304-1. In addition, as shown by FIG. 3A, STA1 304-1 transmits a P2P A-MPDU frame 315 via a P2P frame transmission to another STA, implemented as STA2 304-2, to which STA2 304-2 responds by transmitting a BA frame 316 as previously described with reference to FIG. 2B.

Once STA1 304-1 receives the BA frame 316, STA1 304-1 transmits a Quality of Service (QoS) Null frame 318 to AP1 302 to release the TXOP back to AP1 302 because STA1 304-1 has no further frames to transmit. As an example, the QoS Null frame 318 may include a CAS Control field that explicitly indicates the allocated time release. After receiving the QoS Null frame 318, AP1 302 then transmits an Ack frame 320 to STA1 304-1, such that AP1 302 resumes the frame exchange as the TXOP owner (shown by arrow 322 extending from the Ack frame 320). AP1 302 then transmits a DL A-MPDU frame 324, after which a medium becomes idle (shown by dashed lines 326).

Figure 3B:
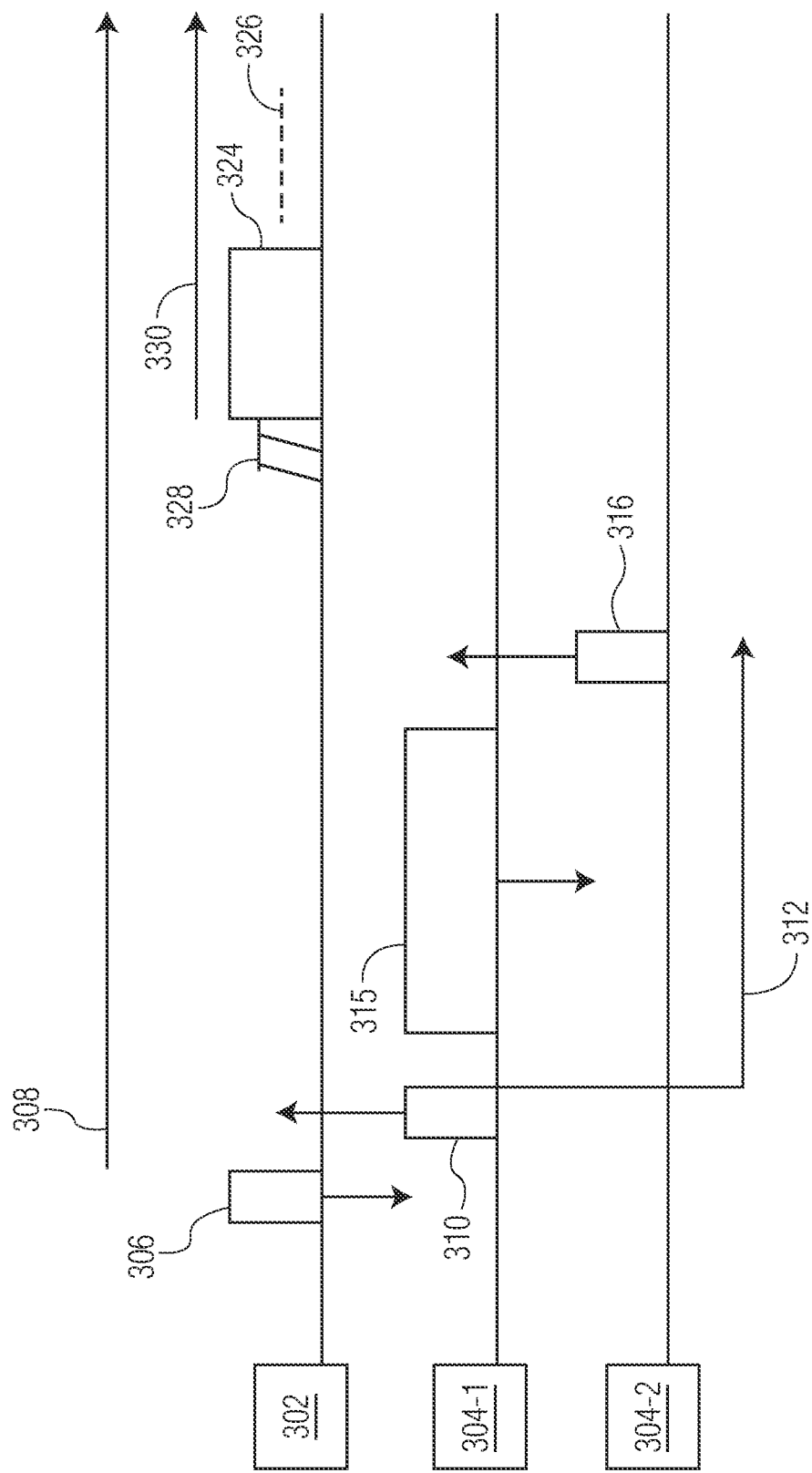
FIG. 3B illustrates another example of frame exchange sequences according to an assisted SU transmission that includes an allocated time release.

FIG. 3B illustrates another example of frame exchange sequences according to an assisted SU transmission that includes an allocated time release. As shown, AP1 302 transmits the MU-RTS TXS frame 306 to STA1 304-1, which begins the TXOP 308 and to which STA1 304-1 responds by transmitting the CTS frame 310 that begins the SP allocated to STA1 304-1 (shown by arrow 312 extending from the CTS frame 310) as previously described with reference to FIG. 3A. In addition, STA1 304-1 transmits the P2P A-MPDU frame 315 via the P2P frame transmission to STA2 304-2, to which STA2 304-2 responds by transmitting the BA frame 316 as previously described with reference to FIG. 3A.

However, in the embodiment shown by FIG. 3B, the SP allocated to STA1 304-1 ends after STA1 304-1 receives the BA frame 316 because STA1 304-1 has used all of the allocated time for a P2P SU frame exchange. Although AP1 302 may not transmit frames during the allocated time for the P2P SU frame exchange, AP1 302 can perform a backoff 328 after the SP allocated to STA1 304-1 to continue the frame exchange. As such, AP1 302 then resumes the frame exchange as the TXOP owner (shown by arrow 330) and transmits the DL A-MPDU frame 324, after which the medium becomes idle (shown by dashed lines 326).

Figure 3C:
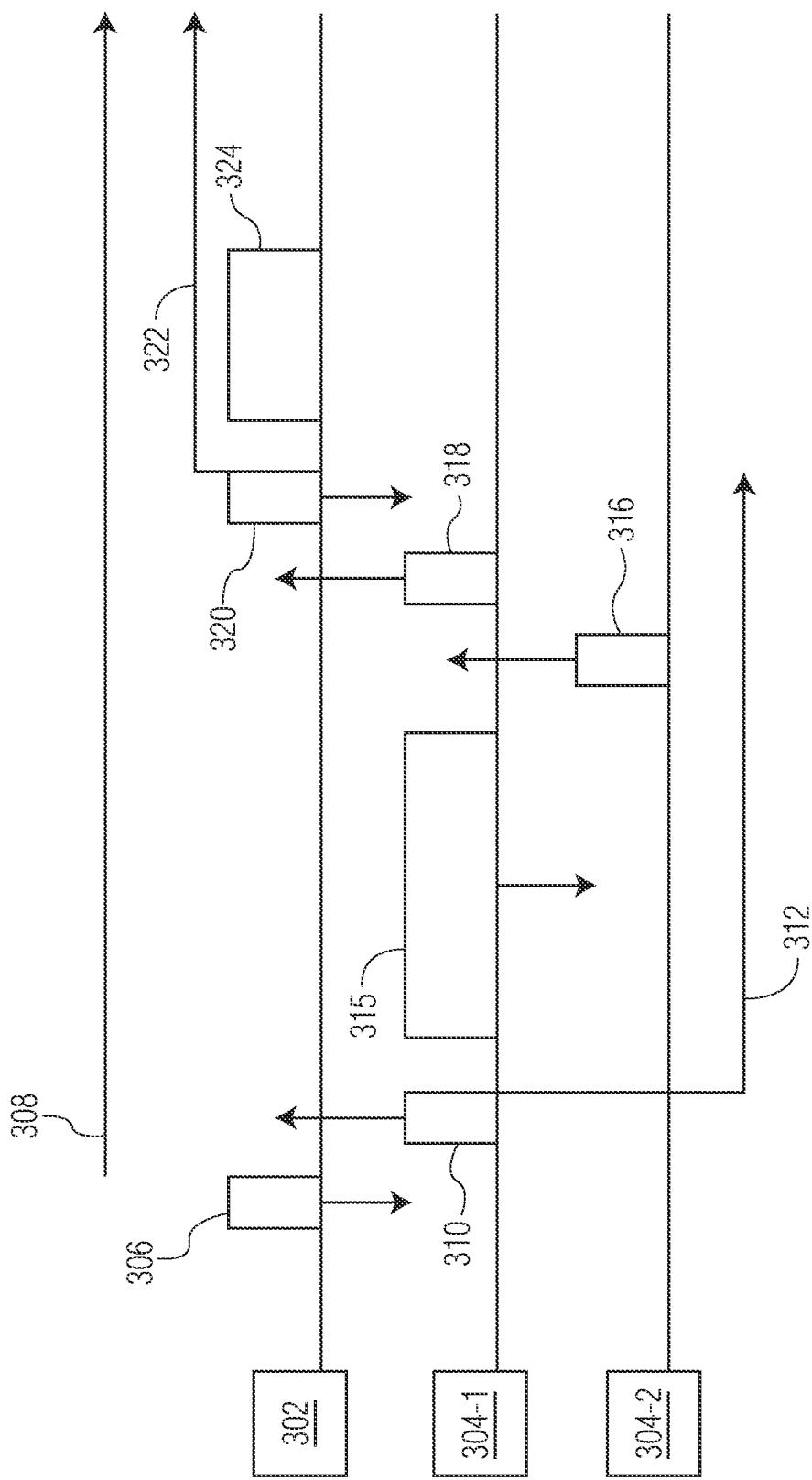
FIG. 3C illustrates another example of frame exchange sequences according to an assisted SU transmission that includes an allocated time release.

FIG. 3C illustrates another example of frame exchange sequences according to an assisted SU transmission that includes an allocated time release. As shown, AP1 302 transmits the MU-RTS TXS frame 306 to STA1 304-1, which begins the TXOP 308 and to which STA1 304-1 responds by transmitting the CTS frame 310 that begins the SP allocated to STA1 304-1 (shown by arrow 312 extending from the CTS frame 310) as previously described with reference to FIG. 3A. In addition, as shown by FIG. 3C, STA1 304-1 transmits the P2P A-MPDU frame 315, to which STA2 304-2 responds by transmitting the BA frame 316 as previously described with reference to FIG. 3A. STA1 304-1 then transmits the QoS Null frame 318, to which AP1 302 responds by transmitting the Ack frame 320 to STA1 304-1, such that AP1 302 resumes the frame exchange as the TXOP owner (shown by arrow 322 extending from the Ack frame 320) and then transmits the DL A-MPDU frame 324, after which the medium becomes idle (shown by dashed lines 326) as previously described with reference to FIG. 3A.

However, in the embodiment shown by FIG. 3C, the P2P frame exchanges initiated by STA1 304-1 end after STA1 304-1 receives the Ack frame 320 because STA1 304-1 does not have enough time for additional P2P SU frame exchanges. In such an embodiment, STA1 304-1 notifies AP1 302 to resume the frame exchange via the QoS Null frame 318 that is transmitted before the allocated time ends. As an example, the QoS Null frame 318 may include an HE Control field that indicates to AP1 302 to resume control of the frame exchange. As such, AP1 302 then resumes control of the frame exchange as the TXOP owner and transmits the DL A-MPDU frame 324.

In some embodiments, an STA (e.g., STA1 304-1) may announce release of an allocated time (e.g., part of the TXOP 308 shown in FIG. 3C) via a QoS Null frame (e.g., QoS Null frame 318) without an HE Control field. As an example, the STA can announce the release of the allocated time via the QoS Null frame without carrying an HE Control field. As another example, the STA can announce the release of the allocated time by transmitting the QoS Null frame to an associated AP (e.g., AP1 302) within the allocated time for a triggered SU transmission. In such an example, the QoS Null frame may carry any HE Control field.

In some embodiments, if an STA (e.g., STA1 304-1) uses all of an allocated time for a P2P SU frame exchange or a UL SU frame exchange, then an original TXOP owner (e.g., AP1 302) may automatically acquire medium access to continue the frame exchange at the end of the allocated time. In such an embodiment, the STA that is allocated time by the AP is not allowed to use the medium longer than the allocated time. Additionally, if the STA transmits frames during an AP assisted SU frame exchange, then the AP may not transmit frames within the allocated time for an AP assisted frame transmission. The AP may also not be allowed to transmit frames during Point Coordination Function (PCF) Interframe Space (PIFS) after the AP assisted frame transmission. As such, the AP may resume the frame exchange by PIFS idle at the end of the allocated time, by PIFS idle after a frame exchange within the allocated time, or by performing a backoff (e.g., backoff 328 shown in FIG. 3B) at the end of the allocated time with a current Contention Window (CW), or the STA that acquired the allocated time may notify the AP to resume the frame exchange by transmitting a frame (e.g., QoS Null frame 318 shown in FIG. 3C) to the AP before the allocated time ends.

FIG. 3D illustrates another example of frame exchange sequences according to an assisted SU transmission that includes an allocated time release. As shown, AP1 302 transmits the MU-RTS TXS frame 306 to STA1 304, which begins the TXOP 308 and to which STA1 304 responds by transmitting the CTS frame 310 that begins the SP allocated to STA1 304 (shown by arrow 312 extending from the CTS frame 310) as previously described with reference to FIG. 3A.

However, in the embodiment shown by FIG. 3D, STA1 304 transmits a UL A-MPDU frame 314 to AP1 302 via a UL frame transmission, such that the UL A-MPDU frame 314 includes a CAS Control field that indicates release of allocated time (e.g., part of the TXOP 308) by STA1 304. In response, AP1 302 transmits a BA frame to STA1 304, such that AP1 302 resumes the frame exchange as the TXOP owner and then transmits the DL A-MPDU frame 324.

In some embodiments, release of the allocated time by STA1 304 can be carried in a QoS Data frame (not shown). As an example, an HE Control field for releasing the allocated time back to AP1 302 can be carried in QoS Data frames included in an A-MPDU (e.g., the UL A-MPDU frame 314). As another example, a control frame for releasing the allocated time back to AP1 302 can be aggregated with QoS Data frames included in an A-MPDU (e.g., the UL A-MPDU frame 314). In addition, further changes may be made to the BA frame 316 to indicate reception of the control frame.

Figure 3E:
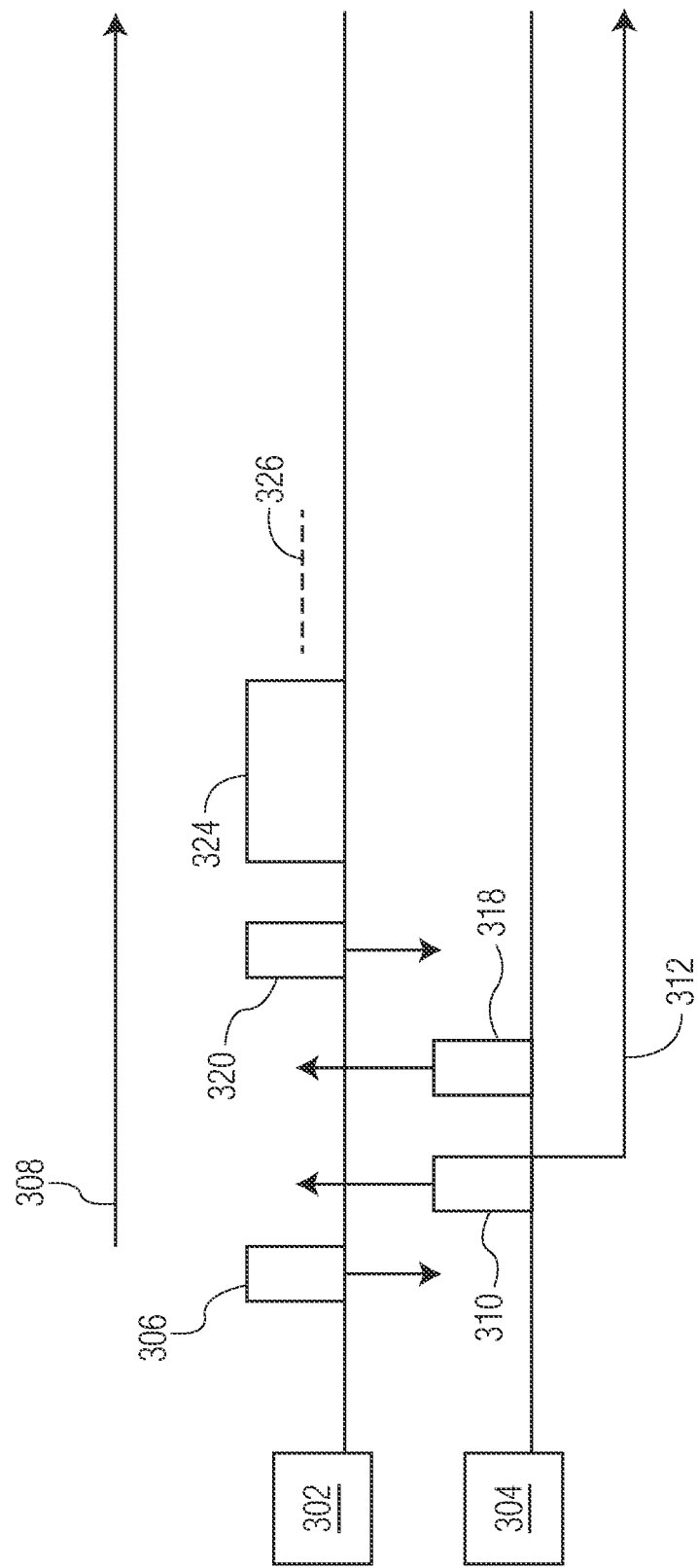
FIG. 3E illustrates another example of frame exchange sequences according to an assisted SU transmission that includes an allocated time release.

FIG. 3E illustrates another example of frame exchange sequences according to an assisted SU transmission that includes an allocated time release. As shown, AP1 302 transmits the MU-RTS TXS frame 306 to STA1 304, which begins the TXOP 308 and to which STA1 304 responds by transmitting the CTS frame 310 that begins the SP allocated to STA1 304 (shown by arrow 312 extending from the CTS frame 310) as previously described with reference to FIG. 3A.

However, in the embodiment shown by FIG. 3E, STA1 304 transmits the QoS Null frame 318 to AP1 302. As an example, the QoS Null frame 318 includes a CAS Control field that indicates release of allocated time (e.g., part of the TXOP 308) by STA1 304. In such an embodiment, STA1 304 transmits the QoS Null frame because STA1 304 does not have any frames to transmit. In response, AP1 302 transmits a BA frame to STA1 304, such that AP1 302 resumes the frame exchange as the TXOP owner and then transmits the DL A-MPDU frame 324, after which the medium becomes idle (shown by dashed lines 326).

Although not shown by FIG. 3E, in one embodiment, instead of indicating the release of the allocated time via the QoS Null frame 318, the CTS frame 310 may indicate the release of the allocated time by STA1 304. In such an embodiment, the QoS Null frame 318 does not need to be transmitted. In another embodiment, when STA1 304 does not have any frames to transmit, STA1 304 may not transmit the CTS frame 310 and/or the QoS Null frame 318.

In some embodiments, an STA may perform a resource request so that an associated AP is aware of a required resource for the STA's AP assisted SU transmission part of a TXOP that is allocated to the STA. As an example, a Buffer Status Report Poll (BSRP) Trigger frame may be used by an AP to solicit a resource request from an associated STA. The resource request may indicate whether a request is for P2P frame exchanges or UL frame exchanges, such that the AP may know whether the resource request is for a P2P frame transmission or a UL frame transmission. In another embodiment, an STA may send its resource request for an AP assisted SU transmission in a QoS Null frame without being solicited by a BSRP Trigger frame.

In some embodiments, an AP may explicitly or implicitly solicit a resource request from an STA in order for an associated AP to allocate resources for an AP assisted SU transmission (e.g., a P2P frame transmission or a UL frame transmission). In one embodiment, implicit soliciting for P2P frame transmissions may involve a TWT negotiation and a BSRP Trigger frame for polling an STA's resource request. In such an embodiment, a TWT negotiation or a broadcast TWT announcement carried in a beacon frame that carries the indication for whether the TWT is for P2P frame transmissions. In a broadcast TWT SP with an indication for a P2P frame transmission or a UL frame transmission, the BSRP Trigger frame without an explicit indication of the P2P frame transmission/UL frame transmission implicitly solicits an STA to report the resource request for AP assisted P2P data frame exchanges, such that the reporting of the STA's resource request implicitly reports the STA's resource request of an AP assisted P2P transmission or an AP assisted UL SU transmission. In some embodiments, explicit soliciting may involve a BSRP Trigger frame including an explicit indication about whether a polled buffer status if for an AP assisted P2P transmission or an AP assisted UL SU transmission. In such an embodiment, the indication may be included in a User Info field where AID12 is equal to 2007.

In some embodiments, a device (e.g., an STA) may report a resource request (e.g., buffer status report) to an associated AP for an AP assisted SU transmission explicitly or implicitly via a QoS Control field, a Buffer Status Report (BSR) Control field, or an HE Control field. In another embodiment, a new HE Control field may be defined for the STA to request the resource for the AP assisted SU transmission.

In an embodiment, the device (e.g., the STA) may implicitly report the resource request to the associated AP for the AP assisted SU transmission via a solicited QoS Control field or a BSR Control field included in a QoS Null frame that reports a P2P resource request or a UL resource request. As an example, if a soliciting BSRP Trigger frame requests the STA to report a P2P resource request, then the solicited QoS Control field or the BSR Control field included in the QoS Null frame reports the P2P request. In such an example, explicit indication in the QoS Control field or the BSR Control field for reporting the resource request for P2P is not needed. As another example, if the soliciting BSRP Trigger frame requests the STA to report a UL resource request, then the solicited QoS Control field or the BSR Control field included in the QoS Null frame reports the UL resource request. In such an example, explicit indication in the QoS Control field or the BSR Control field for reporting the resource request for UL is not needed.

In another embodiment, the device (e.g., the STA) may implicitly report the resource request to the associated AP for the AP assisted SU transmission via a TWT negotiated for a P2P frame transmission (only), such that a buffer status report included in the QoS Control field, the BSR Control field or the HE Control field may be for the P2P frame transmission (only). In such an embodiment, a TWT negotiation or a broadcast TWT announcement included in a beacon frame carries an indication about whether the TWT is for the P2P frame transmission.

In yet another embodiment, the device (e.g., the STA) may implicitly report the resource request to the associated AP for the AP assisted SU transmission via the buffer status report included in the QoS Control field, the BSR Control field, or the new defined HE Control field for certain (or all) Traffic Identifiers (TIDs). In such an embodiment, some TIDs of the STA may (only) be used for a P2P frame transmission, such that the buffer status report is for those TIDs.

In an embodiment, the device (e.g., the STA) may explicitly report the resource request to the associated AP for the AP assisted SU transmission via a buffer status report included in the QoS Control field, the BSR Control field or the new defined HE Control field. In such an embodiment, the device carries an explicit indication about whether a solicited QoS Control field or a new defined HE Control field included in a QoS Null frame, a QoS Data frame, or a management frame reports a UL resource request or a P2P resource request.

In an embodiment, when the HE Control field is used for an explicit resource request, the resource request may indicate a requested medium time, any combination of a TID, and a reference bandwidth, or any combination thereof. The requested medium time indicates that the resource request is for an AP assisted P2P SU transmission or an AP assisted UL SU transmission. In one embodiment, an additional indication may be that the request is for the AP assisted P2P SU transmission (e.g., when the indication is equal to 1) or for the AP assisted UL SU transmission (e.g., when the indication is equal to 0). In another embodiment, the requested medium time indicates that the resource request is for an AP assisted P2P SU transmission, such that the resource request for a TB transmission and an AP assisted UL SU transmission use the same signaling.

In one embodiment, the requested medium time may indicate the medium time being requested for (all) requested TIDs under a reference bandwidth. In one embodiment the reference bandwidth is 20 MHz. In another embodiment, the reference bandwidth is a bandwidth in an HE Control field. In yet another embodiment, one requested medium time may exist for each requested TID. In one embodiment, the TID indicates a TID with highest priority amongst TIDs whose medium time is requested. In another embodiment, a TID bitmap may indicate TIDs whose medium is requested. In an embodiment, the reference bandwidth may indicate a bandwidth used for a P2P frame transmission. Alternatively, the reference bandwidth may be a maximum allowed bandwidth used for the P2P frame transmission. In an embodiment, when a QoS Control field is used for an explicit resource request of an AP assisted SU transmission, the explicit resource request may indicate a requested medium time under a reference bandwidth, and the reference bandwidth without an explicit indication in the QoS Control field. In such an embodiment, the reference bandwidth is a predefined bandwidth (e.g., 20 MHz or 80 MHz).

In some embodiments, a device (e.g., an STA) may report a requested time in a bandwidth to an associated device (e.g., an AP) for an assisted SU transmission explicitly or implicitly via a QoS Control field or a BSR Control field. The requested time of the bandwidth can be implicitly indicated, for example, the requested time may be a specific time in a 20 MHz bandwidth, and if a TXOP bandwidth is 80 MHz, then the requested time will become a quarter of the specific time. As an example, the implicit indication may involve the bandwidth being 80 MHz, an STA's bandwidth capability, an AP's bandwidth capability, or a BSS operating bandwidth. Alternatively, the requested time of the bandwidth can be explicitly indicated, for example, the requested time and the bandwidth are carried in the QoS Control field or the new defined HE Control field.

In some embodiments, when an AP allocates part of a TXOP to an STA (e.g., STA1) for a P2P frame transmission, STA1 may exchange frames with another STA (e.g., STA2). In such an embodiment, the AP, STA1, and STA2 may have different neighbors and/or STA2 may not associate with the AP. Consequently, if a Duration field included in an MAC header or a PHY header of frames addressed to STA2 is set per a Duration field included in STA1's responding CTS frame (e.g., to indicate a same ending time) and indicates the end of the TXOP, then a medium could be over protected. Accordingly, the Duration field included in an MAC header or a PHY header of frames transmitted by STA2 also indicates the end of the TXOP. Additionally, if STA2 receives a frame from the AP (different from an MU-RTS TXS frame), then STA2 will set its network allocation vector (NAV) accordingly, but, after receiving a frame (e.g., an RTS frame) from STA1, STA2 may not be able to transmit a responding frame. As such, a Duration field may need to be defined for frame exchanges where a device (e.g., an AP or an STA) is allocated part of a TXOP. Examples of frame exchanges where a Duration field carries an indication are described in further detail with reference to FIGS. 4A-4C.

FIG. 4A illustrates an example of frame exchanges where a Duration field carries an indication. In the embodiment shown by FIG. 4A, AP1 402, a TXOP owner, initiates the frame exchanges by transmitting a CTS-to-Self frame 406, which begins a TXOP 408. AP1 402 then transmits an MU-RTS TXS frame 410 to STA1 404-1, whose Duration field indicates the same ending time of the TXOP 408 (shown by arrow 412 extending from the MU-RTS TXS frame 410). In such an embodiment, when AP1 402 transmits the MU-RTS TXS frame 410, a neighbor STA, STA2 404-2, sets its NAV timer 414. STA1 404-1 then responds by transmitting a CTS frame 416-1 to AP1 402, which begins an SP allocated to STA1 404-1 (shown by arrow 418 extending down from the CTS frame 416-1) and a duration of a CTS (shown by arrow 420 extending up from the CTS frame 416-1). As an example, STA1 404-1 may become the TXOP owner during the SP allocated to STA1 404-1. STA1 404-1 then transmits an RTS frame 422 to STA2 404-2. However, STA2 404-2 cannot transmit another CTS frame 416-2 to STA1 404-1 because STA2's NAV timer 414 has a non-zero value.

In an embodiment, to allow STA2 404-2 to ignore its NAV timer 414, STA1 404-1 may notify STA2 404-2 of AP1 402 address (not shown) so that when the NAV timer is set per a frame or PPDU from AP1 402 (e.g., MU-RTS TXS frame 410) and a frame is received from STA1 404-1 (e.g., RTS frame 422), then STA2's virtual carrier sensing can ignore a non-zero value of the NAV timer. As shown in FIG. 4A, after the receiving the RTS frame 422 from STA1 404-1, STA2 404-2 ignores its non-zero NAV timer 414 and responds with the CTS frame 416-2. After the RTS frame 422 and the CTS frame 416-2 are exchanged, STA1 404-1 starts P2P data frame exchanges with STA2 404-2.

In another embodiment, to allow STA2 404-2 to ignore its NAV timer 414, when STA1 404-1 transmits a frame (e.g., RTS frame 422) to STA2 404-2, the RTS frame 422 may include a transmitter address (TA) field that is equal to a BSS Identifier (BSSID) of AP1 402 or that is equal to a bandwidth signaling TA of AP1. In such an embodiment, STA2 404-2 will ignore its non-zero NAV timer 414 and transmit the CTS frame 416-2. In addition, AP1 may ignore the CTS frame 416-2 since AP1 did not transmit an RTS frame to solicit the CTS frame. After the RTS frame 422 and the CTS frame 416-2 are exchanged, STA1 404-1 starts P2P data frame exchanges with STA2 404-2.

Figure 4B:
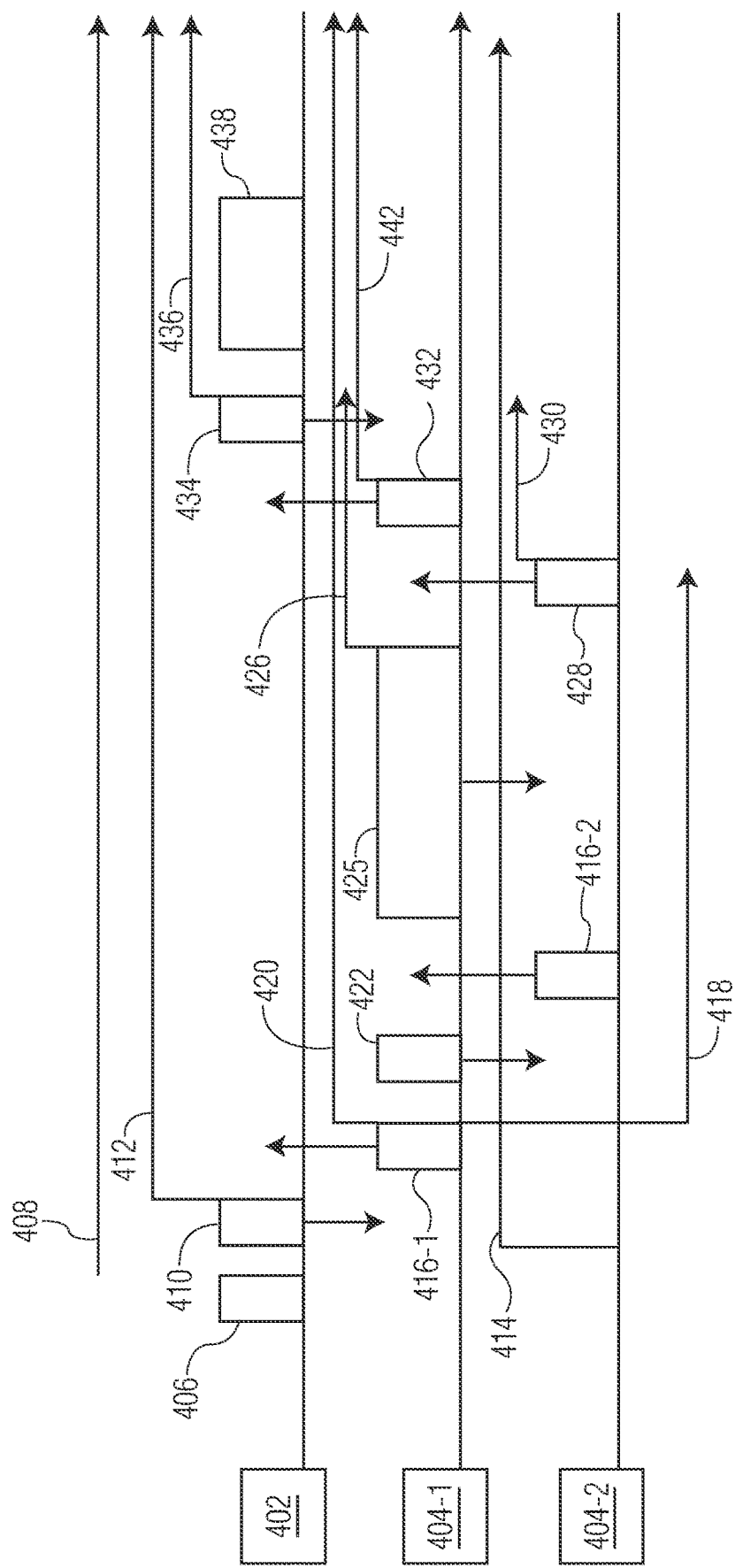
FIG. 4B illustrates another example of frame exchanges where a Duration field carries an indication.

FIG. 4B illustrates another example of frame exchanges where a Duration field carries an indication. In an embodiment, the Duration field of a frame transmitted by STA1 404-1 to STA2 404-2 indicates the end of an allocated time to STA1 instead of the TXOP 408. Accordingly, the Duration field of the frame transmitted by STA2 404-2 to STA1 404-1 also indicates the end of the allocated time to STA1 instead of the TXOP 408.

As shown, AP1 402 initiates the frame exchanges by transmitting the CTS-to-Self frame 406, which begins the TXOP 408, AP1 402 then transmits the MU-RTS TXS frame 410 to STA1 404-1, whose Duration field indicates the end of the TXOP 408 (shown by arrow 412 extending from the MU-RTS TXS frame 410) and causes STA2 404-2 to set its NAV timer 414. STA1 404-1 then responds by transmitting the CTS frame 416-1 to AP1 402, which begins the SP allocated to STA1 404-1 (shown by arrow 418 extending down from the CTS frame 416-1) and whose Duration field indicates the end of the TXOP (shown by arrow 420 extending up from the CTS frame 416-1). STA1 404-1 then transmits the RTS frame 422 to STA2 404-2 whose Duration field indicates the end of the allocated time for P2P frame exchanges, and in response, STA2 404-2 transmits the CTS frame 416-2 to STA1 404-1 whose Duration field also indicates the end of the allocated time for P2P frame exchanges. With such a Duration restriction, the NAV timers of STA2's neighbors (but not STA1's or AP1's neighbors) can continue backoffs at the end of the allocated time for P2P frame exchanges.

In the embodiment shown by FIG. 4B, the frame exchange continues as STA1 404-1 transmits a P2P A-MPDU frame 425 to STA2 404-2, where Duration fields of aggregated frames indicate the end of the allocated time for P2P frame exchanges (shown by arrow 426 extending from the P2P A-MPDU frame 425). In response, STA2 404-2 transmits a BA frame 428, whose Duration field indicates the end of the allocated time for P2P frame exchanges (shown by arrow 430 extending from the BA frame 428). With such Duration restrictions, the NAV Timers of STA2's neighbors (but not STA1/AP's neighbors) will become 0 at the end of the allocated time for P2P frame exchanges, and STA2's neighbors (but not STA1/AP's neighbors) can continue their backoff at the end of the allocated time for P2P frame exchanges. STA1 404-1 then transmits a QoS Null frame 432 to AP1 402 whose Duration field indicates the end of the TXOP (shown by arrow 442 extending from the QoS Null frame 432), to which AP1 402 responds by transmitting an Ack frame 434, whose Duration field indicates the end of the TXOP (shown by arrow 436 extending from the Ack frame 434). AP1 402 then transmits a DL A-MPDU frame 438.

In such an embodiment, AP1 402 initiates an AP assisted P2P transmission by transmitting the CTS-to-Self frame 406 and the MU-RTS TXS frame 410. As an example, the CTS-to-Self frame 406 may include a Resource Address (RA) with an address of STA1 404-1. In one embodiment, if the CTS-to-Self frame 406 is not the first frame transmitted within the TXOP 408, then a TXOP ending time indicated by a Duration field included in the CTS-to-Self frame may be no earlier than a TXOP ending time indicated by a Duration field included in the MU-RTS TXS frame 410. In another embodiment, if the CTS-to-Self frame 406 is not the first frame transmitted within the TXOP 408, then a TXOP ending time indicated by a Duration field included in the CTS-to-Self frame may be no later than a TXOP ending time indicated by a Duration field included in a previous frame transmitted within the TXOP. If an AP exchanges frames with other STAs after the AP assisted P2P transmission initiated by the CTS-to-Self frame 406 and MU-RTS TXS frame 410, then the AP transmits another CTS-to-Self frame (not shown) that includes a Duration field that indicates a later ending TXOP time before the frame exchanges with the other STAs.

In some embodiments, after a first STA (e.g., STA1 404-1) transmits a CTS frame (e.g., CTS frame 416-1) in response to an MU-RTS TXS frame (e.g., MU-RTS TXS frame 410), the first STA may transmit to a second STA (e.g., STA2 404-2), a CTS-to-Self frame. In an embodiment, the CTS frame may include a Duration field with a value of DURATION. In such an embodiment, the CTS-to-Self frame may include a Duration field that is more than DURATION, minus Short Interframe Space (SIFS), and minus a transmission time of a PPDU that includes the CTS-to-Self frame. As an example, the value in the Duration field of the CTS-to-Self frame has a value of 1 microsecond (p) more than DURATION, minus SIFS, and minus a transmission time of a PPDU that includes the CTS-to-Self frame. The second STA may then set its NAV timer in response to receiving the CTS-to-Self frame. By having a larger value in the Duration field of the CTS-to-Self frame, the second STA can avoid having its NAV timer set by an AP. Therefore, with such a NAV timer setting, if a scheduled STA for a TXOP sharing a P2P frame transmission transmits an RTS frame to a P2P peer STA SIFS after the CTS-to-Self frame, then the P2P peer STA can transmit a CTS frame.

Figure 4C:
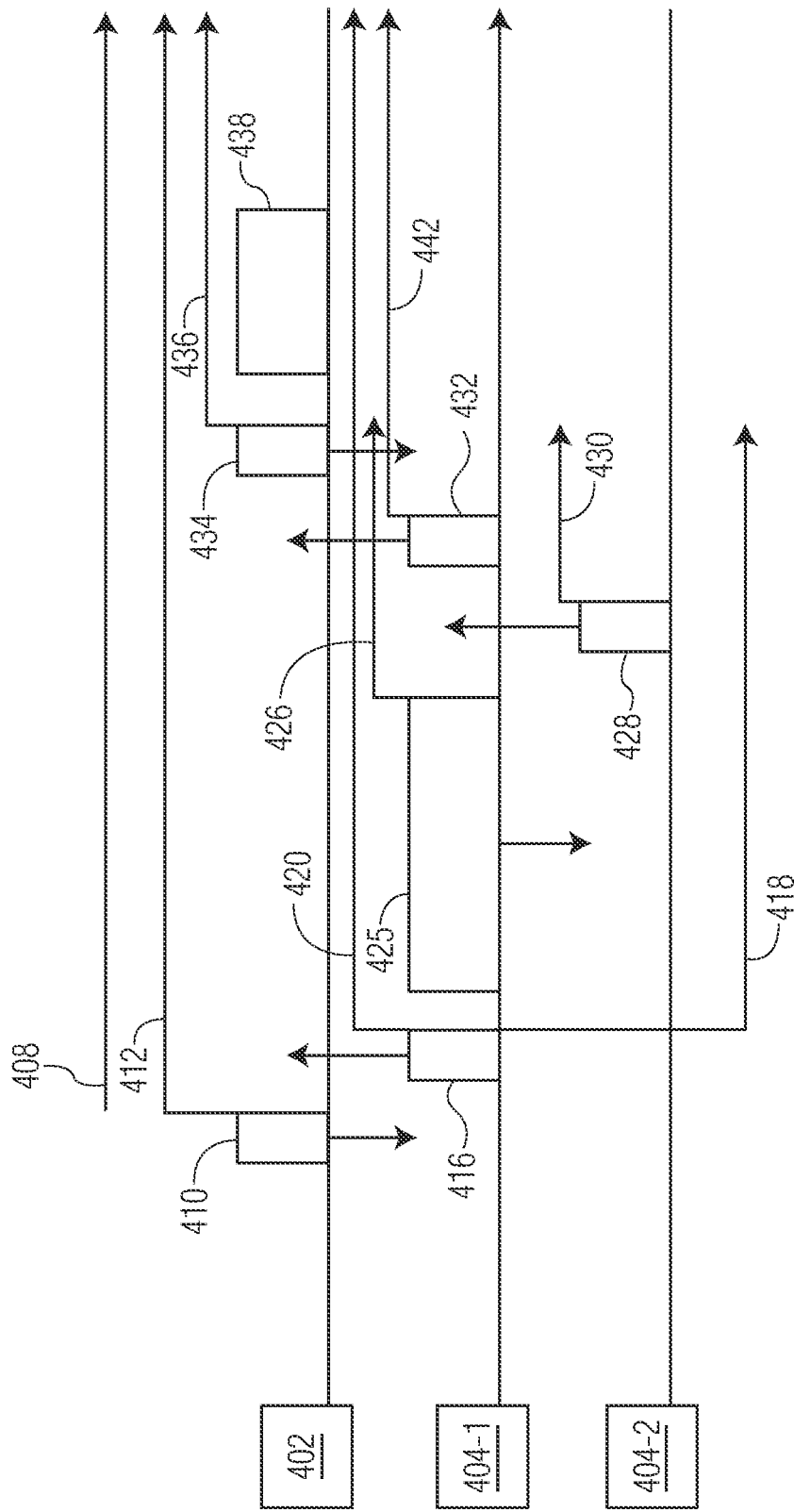
FIG. 4C illustrates another example of frame exchanges where a Duration field carries an indication.

FIG. 4C illustrates another example of frame exchanges where a Duration field carries an indication. In an embodiment, the Duration field of a frame transmitted by STA1 404-1 to STA2 404-2 for P2P frame exchanges indicates a time no later than an allocated time for P2P frame exchanges.

As shown, AP1 402 transmits the MU-RTS TXS frame 410 to STA1 404-1, which begins the duration of the RTS (shown by arrow 412 extending from the MU-RTS TXS frame 410) as previously described with reference to FIG. 4B. STA1 404-1 then responds by transmitting the CTS frame 416 to AP1 402, which begins the SP allocated to STA1 404-1 (shown by arrow 418 extending down from the CTS frame 416) and whose Duration field indicates the end of the TXOP 408 (shown by arrow 420 extending up from the CTS frame 416). STA1 404-1 then transmits the P2P A-MPDU frame 425 to STA2 404-2, whose Duration field indicates the end of allocated time for P2P frame exchanges (shown by arrow 426 extending from the P2P A-MPDU frame 425) as previously described with reference to FIG. 4B.

In response, STA2 404-2 transmits the BA frame 428, whose Duration field also indicates the end of allocated time for P2P frame exchanges (shown by arrow 430 extending from the BA frame 428), then STA1 404-1 transmits the QoS Null frame 432, and in response, AP1 402 transmits the Ack frame 434, whose Duration field indicates the end of the TXOP 408 (shown by arrow 436 extending from the Ack frame 434), after which AP1 402 transmits the DL A-MPDU frame 438. With such Duration restrictions, the NAV Timers of STA2's neighbors (but not STA1/AP's neighbors) will become 0 at the end of the allocated time for P2P frame exchanges, and STA2's neighbors (but not STA1/AP's neighbors) can continue their backoff at the end of the allocated time for P2P frame exchanges.

In the embodiment shown by FIG. 4C, the frame exchange does not include AP1 402 transmitting a CTS-to-Self frame to begin the TXOP 408, for example, as shown in FIG. 4B. Instead, transmission of the MU-RTS TXS frame 410 begins the TXOP 408. In addition, the frame exchange does not involve STA1 404-1 transmitting an RTS frame to STA2 404-2, and STA2 responding by transmitting a CTS frame, for example, as shown in FIG. 4B. The frame exchange shown in FIG. 4C is able to continue without the RTS frame and the CTS frame being transmitted by STA1 and STA2, respectively, because STA1 operates as if protection through the RTS frame and the CTS frame exchanged between STA1 and STA2 is not required. In such an embodiment, the Duration field included in the MAC header of the frame(s) (or the PHY header of the PPDU carrying the frame(s)) addressed to STA2 is set no later than an ending time within the TXOP 408 allocated to STA1 404-1.

In some embodiments, a device (e.g., an AP or an STA) may perform an error recovery when an error occurs during a frame exchange. As an example, an error may occur when a solicited STA (e.g., STA1) that is associated with an AP is to exchange frames according to a P2P frame transmission with another STA (e.g., STA2) that is not associated with the AP. If a first P2P frame exchange between STA1 and STA2 fails after transmitting a CTS frame solicited by an MU-RTS TXS frame, then STA may increase its CW as per collision rules and release its time to the AP after a PIFS idle medium as the error recovery. Alternatively, if the first P2P frame exchange between STA1 and STA2 fails after transmitting a CTS frame solicited by an MU-RTS TXS frame, then STA1 can perform a PIFS recovery or a backoff recovery as the error recovery. If the first P2P frame exchange is successful and a second P2P frame exchange between STA1 and STA2 fails, then STA1 can perform the PIFS recovery or the backoff recovery as the error recovery.

As another example, an error may occur when a solicited STA (e.g., STA1) that is associated with an AP is to exchange frames according to a P2P frame transmission with another STA (e.g., STA2) that is also associated with the AP. In an embodiment, the error recovery may involve the AP performing a PIFS recovery or a backoff recovery if a medium is idle for PIFS within allocated time for a frame exchange according to a P2P frame transmission between STA1 and STA2. In such an embodiment, the AP can also exchange frames with other STAs (or STA1) within remaining time of the TXOP.

As another example, an error may occur when a solicited STA (e.g., STA1) that is associated with an AP is to exchange frames according to an assisted SU transmission with the AP. In some embodiments, if STA1 does not initiate a following frame exchange with the AP during an allocated time for STA1, then the AP can perform a PIFS recovery or a backoff recovery as the error recovery. In addition, the AP can also exchange frames with others STAs (or STA1) within remaining time of a TXOP.

In some embodiments, a device (e.g., a first STA) may exchange frames with another device (e.g., a second STA) according to an assisted SU transmission (e.g., an STA assisted SU transmission). In such an embodiment, the first STA can allocate time to the second STA for the STA assisted SU transmission). An example of frame exchanges according to an STA assisted SU transmission is described in further detail with reference to FIG. 5.

Figure 5:
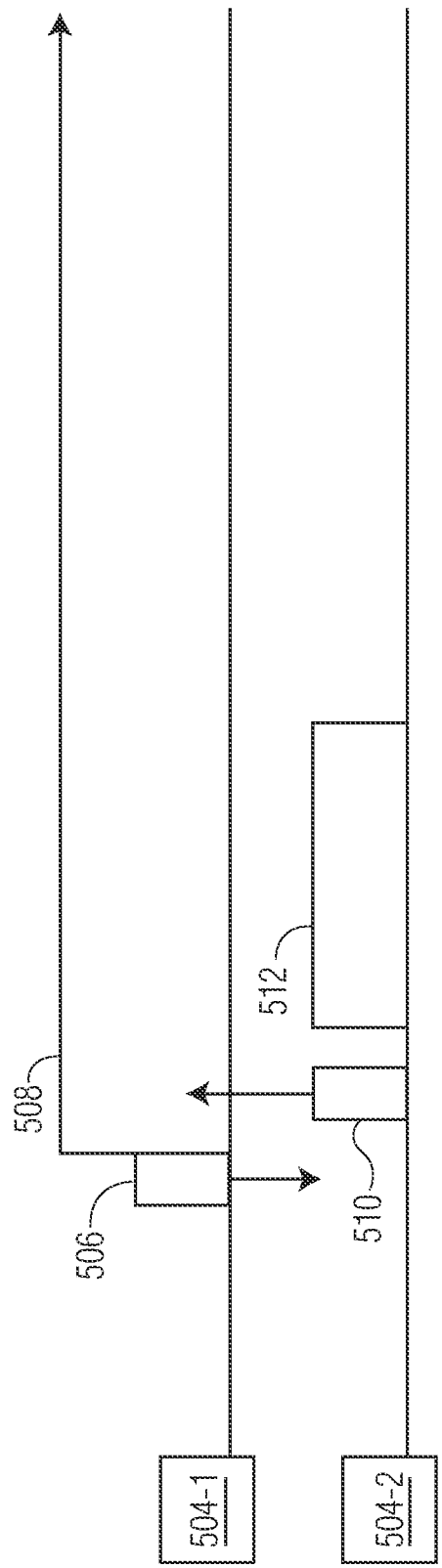
FIG. 5 illustrates an example of frame exchanges according to a station (STA) assisted SU transmission.

FIG. 5 illustrates an example of frame exchanges according to an STA assisted SU transmission. In the embodiment shown by FIG. 5, a device, implemented as STA1 504-1, is a TXOP owner that initiates the frame exchange according to the STA assisted SU transmission by transmitting an MU-RTS TXS frame 506 to another device, implemented as STA2 504-2. Transmission of the MU-RTS TXS frame 506 also begins a duration of an RTS (shown by arrow 508 extending from the MU-RTS TXS frame 506), during which the TXOP owner, STA1 504-1, may allocate time for STA2 504-2 to be the TXOP owner. Once STA2 504-2 has successfully received the MU-RTS TXS frame 506, STA2 504-2 transmits a CTS frame 510 to STA1 504-1. After the CTS frame 510 has been transmitted by STA2 504-2, STA2 504-2 then transmits an A-MPDU frame 512.

In one embodiment, an STA (e.g., STA1) can allocate part of its TXOP to another STA (e.g., STA2), such that STA2 uses an allocated time for frame exchanges initiated by STA2 (e.g., STA assisted SU). In another embodiment, an STA can allocate part of its TXOP to an AP (e.g., STA assisted SU), such that the AP uses the allocated time for frame exchanges initiated by the AP.

Figure 6:
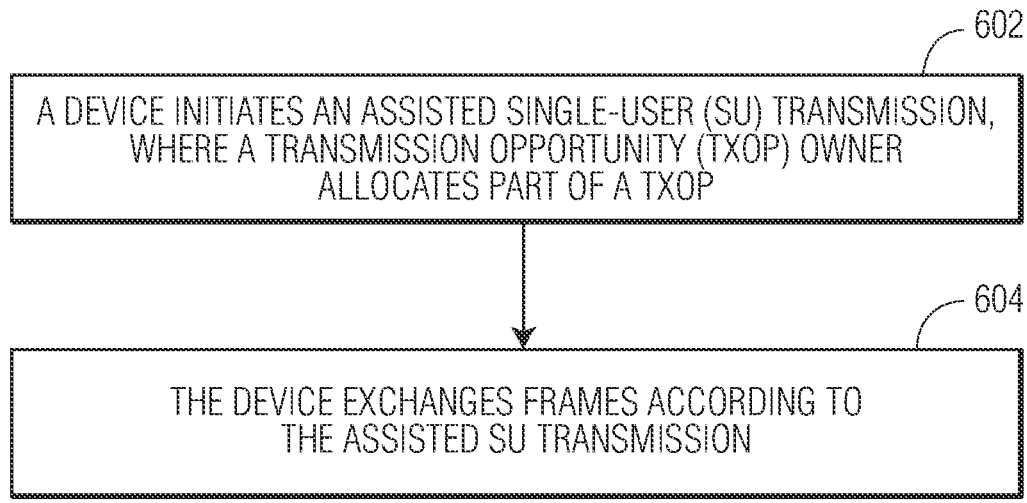
FIG. 6 illustrates a flow diagram of a technique for wireless communications in accordance with an embodiment of the invention.

FIG. 6 illustrates a flow diagram of a technique for wireless communications in accordance with an embodiment of the invention. At block 602, a device initiates an assisted SU transmission, where a TXOP owner allocates part of a TXOP. At block 604, the device exchanges frames according to the assisted SU transmission.

In some embodiments, the technique for wireless communications may be implemented by a device (e.g., an AP or an STA). For example, a device may include a processor configured to initiate an assisted SU transmission, wherein the device is a TXOP owner that allocates part of a TXOP, and exchange frames according to the assisted SU transmission.

In some embodiments, the technique for wireless communications may be implemented by a system. For example, a system may include an AP, wherein the AP includes a processor configured to initiate an AP assisted SU transmission, wherein the AP is a TXOP owner that allocates part of a TXOP, and an STA, wherein the STA includes another processor configured to exchange frames with the AP according to the AP assisted SU transmission.

Figure 7:
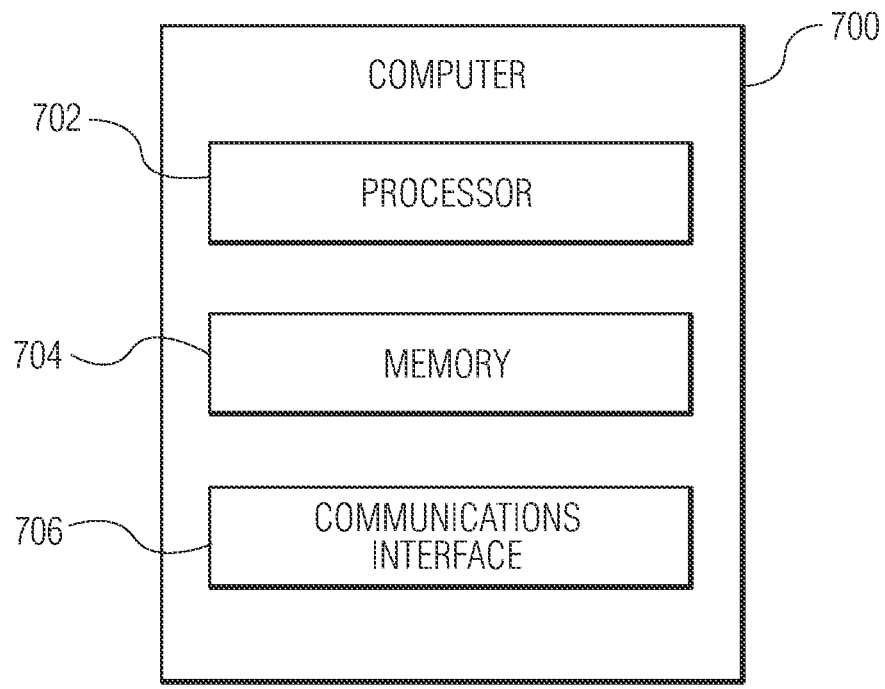
FIG. 7 depicts an example of a computer that can implement a technique for wireless communications.

In an embodiment, the above-described functionality is performed at least in part by a computer or computers, which executes computer readable instructions. FIG. 7 depicts an example of a computer 700 that can implement the technique for wireless communications as described herein with reference to FIG. 6. As shown, the computer 700 includes a processor 702, a memory 704, and a communications interface 706. The processor may include a multifunction processor and/or an application-specific processor. The memory within the computer may include, for example, storage medium such as read only memory (ROM), flash memory, random-access memory (RAM), and a large capacity permanent storage device such as a hard disk drive. The communications interface enables communications with other computers via, for example, the Internet Protocol (IP). The computer executes computer readable instructions stored in the storage medium to implement various tasks as described above.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, an RAM, an ROM, a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc. Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A device comprising:
a processor configured to:
   initiate an assisted single-user (SU) transmission, wherein the device is a Transmission Opportunity (TXOP) owner that allocates part of a TXOP and the allocation is based on a resource request reported in a High Efficiency (HE) control field of a Quality of Service (QOS) Null frame or a QoS Data frame, the HE control field which defines a requested medium time for a reference bandwidth of 20 MHz and implicitly one quarter of the requested medium time for a reference bandwidth of 80 MHz; and
   exchange frames with an STA according to the assisted SU transmission.

2. The device of claim 1, wherein the device is an access point (AP) that allocates part of the TXOP to the station (STA) for an uplink (UL) frame transmission, and wherein the AP remains the TXOP owner during an allocated time.

3. The device of claim 1, wherein the device is an AP that allocates part of the TXOP to the STA for a peer-to-peer (P2P) frame transmission, and wherein the STA becomes the TXOP owner during an allocated time.

4. The device of claim 1, wherein the device is an AP that allocates part of the TXOP to the STA for a mixed P2P and UL frame transmission, and wherein the STA becomes the TXOP owner during an allocated time.

5. The device of claim 1, wherein the device is an AP that allocates part of the TXOP to the STA, and wherein the STA releases the TXOP allocation back to the AP via an explicit indication included in a reserved bit in a context-aware service (CAS) control field of the High Efficiency (HE) Control field of a QoS null frame when the STA has no frames to transmit.

6. The device of claim 1, wherein the device is an AP that allocates part of the TXOP to the STA, and wherein the STA reports the resource request to the AP for the assisted SU transmission.

7. The device of claim 6, wherein the resource request is reported via at least one of a Quality of Service (QOS) Control field, a Buffer Status Report (BSR) Control field, and the HE Control field.

8. The device of claim 6, wherein the resource request indicates at least one of:
the requested medium time and a Traffic Identifier (TID); and
the requested medium time, the TID, and the reference bandwidth.

9. The device of claim 8, wherein the requested medium time indicates a medium time requested for requested TIDs.

10. The device of claim 8, wherein the TID indicates a TID with highest priority amongst TIDs whose medium time is requested.

11. The device of claim 8, wherein the reference bandwidth indicates at least one of a bandwidth used for a P2P frame transmission and a maximum allowed bandwidth.

12. The device of claim 1, wherein the device is an AP that allocates part of the TXOP to the STA for a P2P frame transmission, and wherein the AP initiates the assisted SU transmission by transmitting a Clear to Send (CTS)-to-Self frame and a multi-user (MU) Request to Send (RTS) (MU-RTS) TXOP Sharing (TXS) frame.

13. The device of claim 1, wherein the device is an AP that allocates part of the TXOP to the STA which is a first STA, and wherein the assisted SU transmission includes:
transmitting, by the first STA to the AP, a CTS frame in response to receiving an MU-RTS TXS frame, wherein the CTS frame includes a Duration field with a value of DURATION; and
transmitting, by the first STA to a second STA, a CTS-to-Self frame whose Duration field is more than DURATION minus Short Interframe Space (SIFS) minus a transmission time of a Physical Layer Convergence Protocol (PLCP) Protocol Data Unit (PPDU) that includes the CTS-to-Self frame.

14. The device of claim 13, wherein the second STA sets a network allocation vector (NAV) timer in response to receiving the CTS-to-Self frame.

15. The device of claim 1, wherein the device is an AP that allocates part of the TXOP to the STA which is a first STA, and wherein the assisted SU transmission includes:
transmitting, by the first STA to the AP, a CTS frame in response to receiving an MU-RTS TXS frame; and
transmitting, by the first STA to a second STA, a frame with a Duration field in at least one of a Media Access Control (MAC) header and a physical layer (PHY) header.

16. The device of claim 15, wherein the Duration field is set no later than an ending time within the TXOP allocated to the first STA.

17. The device of claim 1, wherein the device is an AP that allocates part of the TXOP to the STA, and wherein the assisted SU transmission is an AP assisted SU transmission.

18. The device of claim 1, wherein the device is an STA that allocates part of the TXOP to another STA, and wherein the assisted SU transmission is an STA assisted SU transmission.

19. A system comprising:
an access point (AP), wherein the AP includes a processor configured to:
initiate an AP assisted single-user (SU) transmission, wherein the AP is a Transmission Opportunity (TXOP) owner that allocates part of a TXOP and the allocation is based on a resource request reported in a High Efficiency (HE) control field of a Quality of Service (QOS) Null frame or a QoS Data frame, the HE control field which defines a requested medium time for a reference bandwidth of 20 MHz and implicitly one quarter of the requested medium time for a reference bandwidth of 80 MHz; and
a station (STA), wherein the STA includes another processor configured to:
exchange frames with the AP according to the AP assisted SU transmission.

20. A method of wireless communications, the method comprising:
initiating, by a device, an assisted single-user (SU) transmission, wherein a Transmission Opportunity (TXOP) owner allocates part of a TXOP and the allocation is based on a resource request reported in a High Efficiency (HE) control field of a Quality of Service (QOS) Null frame or a QoS Data frame, the HE control field which defines a requested medium time for a reference bandwidth of 20 MHz and implicitly one quarter of the requested medium time for a reference bandwidth of 80 MHz; and
exchanging, by the device, frames with an STA according to the assisted SU transmission.

* * * * *